United States Patent [19]

Sakai

[11] Patent Number: 4,633,750

[45] Date of Patent: Jan. 6, 1987

[54] KEY-TOUCH VALUE CONTROL DEVICE OF ELECTRONIC KEY-TYPE MUSICAL INSTRUMENT

[75] Inventor: Tadao Sakai, Hamamatsu, Japan

[73] Assignee: Roland Kabushiki Kaisha, Osaka, Japan

[21] Appl. No.: 735,205

[22] Filed: May 17, 1985

[30] Foreign Application Priority Data

May 19, 1984 [JP] Japan ................................59-101184

[51] Int. Cl.4 ........................ G10H 1/02; G10H 1/46; G06F 1/02; G04F 10/00

[52] U.S. Cl. ........................................ 84/1.1; 84/1.27; 364/569; 364/722

[58] Field of Search .................... 84/1.1, 1.27, DIG. 7; 364/569, 722

[56] References Cited

U.S. PATENT DOCUMENTS

| | | | |
|---|---|---|---|
| 3,882,751 | 5/1975 | Tomisawa et al. | 84/1.1 X |
| 4,067,253 | 1/1978 | Wheelwright et al. | 84/1.1 |
| 4,144,789 | 3/1979 | Deutsch | 84/1.27 X |
| 4,185,532 | 1/1980 | Hiyoshi | 364/722 X |
| 4,493,237 | 1/1985 | DeLong et al. | 84/1.1 X |
| 4,523,288 | 6/1985 | Hayashi | 364/569 |
| 4,558,623 | 12/1985 | Buchla | 84/1.1 |

*Primary Examiner*—William B. Perkey
*Attorney, Agent, or Firm*—Wenderoth, Lind & Ponack

[57] ABSTRACT

A key-touch value control device for an electronically operated musical instrument including a series of keys, wherein the state of each of the keys is detected to produce a succession of key-state signals each indicative of one of the key-on state, key-off state and key-fly state of the key. In response to each of the key-state signals, a key-touch value signal is produced which is variable with the velocity at which the key is being depressed toward the key-on state and which is representative of the volume of the sound to be produced after the key has reached the key-on state.

2 Claims, 10 Drawing Figures

FIG. 5

| | 7 | 6 | 5 | 4 | 3 | 2 | 1 | 0 | |
|---|---|---|---|---|---|---|---|---|---|
| 127 | 0 | 0 | 0 | 0 | 0 | 0 | 0 | 0 | ← b |
| 126 | 0 | 0 | 0 | 0 | 0 | 0 | 0 | 0 | |
| 6 | 0 | 0 | 0 | 0 | 0 | 0 | 0 | 0 | ← c |
| 5 | 0 | 0 | 0 | 0 | 0 | 0 | 0 | 1 | ← d |
| 4 | 0 | 0 | 0 | 0 | 0 | 0 | 1 | 0 | ← e |
| 3 | 1 | 1 | 1 | 1 | 1 | 1 | 1 | 1 | ← f |
| 2 | X | X | X | X | X | X | X | X | |
| 1 | X | X | X | X | X | X | X | X | |
| 0 | 0 | 0 | 0 | 0 | 0 | 0 | 0 | 1 | ← a |

FIG. 9

| | 7 | 6 | 5 | 4 | 3 | 2 | 1 | 0 | |
|---|---|---|---|---|---|---|---|---|---|
| 127 | 0 | 1 | 1 | 1 | 1 | 1 | 0 | 1 | (125) ← b |
| 126 | X | X | X | X | X | X | X | X | |
| 125 | 0 | 1 | 1 | 1 | 1 | 0 | 1 | 0 | (122) ← c |
| … | | | | | | | | | |
| 8 | 0 | 0 | 0 | 0 | 0 | 1 | 1 | 0 | (6) ← d |
| 7 | X | X | X | X | X | X | X | X | |
| 6 | 0 | 0 | 0 | 0 | 0 | 1 | 0 | 1 | (5) ← e |
| 5 | 1 | 0 | 0 | 0 | 0 | 1 | 0 | 0 | (4) ← f |
| 4 | 0 | 0 | 0 | 0 | 0 | 0 | 1 | 1 | (3) ← g |
| 3 | 0 | 0 | 0 | 0 | 0 | 0 | 1 | 1 | (3) ← h |
| 2 | X | X | X | X | X | X | X | X | |
| 1 | X | X | X | X | X | X | X | X | |
| 0 | 1 | 0 | 0 | 0 | 0 | 0 | 0 | 1 | (1) ← a |

KEY-TOUCH VALUE CONTROL DEVICE OF ELECTRONIC KEY-TYPE MUSICAL INSTRUMENT

FIELD OF THE INVENTION

The present invention relates in general to an electronically operated musical instrument using an assembly of keys such as a keyboard and, in particular, to a key-touch value control device for a key-operated electronic musical instrument. More particularly, the present invention relates to a key-touch value control device for a key-operated electronic musical instrument in which the volumes of the sound to be produced are controlled to vary with the velocities of strokes of the keys being depressed by finger pressures.

BACKGROUND OF THE INVENTION

It is well known in the art that the amplitude of a sound produced by a piano, a representative example of manually operated key-type musical instruments, is inversely proportional to the square value of the key-fly state of a key. Skilled pianists utilize this property of pianos ingeniously and adjust not only the pitches but the volumes of sounds by depressing keys with controlled finger pressures to produce subtle sounds. The term "key-fly" state as above mentioned refers to the period of time for which a key is being depressed, viz., a key is in a state flying from a key-off state released from finger pressure toward a fully-depressed or key-on state under a pressure manually applied to the key.

Electronically operated key-type musical instruments are presently in use and are expected to have potential expressibilities comparable to those of traditional pianos. Such electronic instruments are also required to be capable of producing sounds in volumes which vary in certain relationships to key-fly states. To meet such a requirement, a known electronically operated key-type musical instrument has incorporated therein a control device including key-touch sensors. The key-touch sensors are provided respectively in association with the individual keys of the instrument and are adapted to produce analog signals, or voltages, which vary in a particulate functional relationship with the periods of time for which the keys are in the key-fly states.

The signal voltages thus produced by the key-touch sensors are stored in capacitors which are also provided respectively in association with the individual keys of the instrument. Provision of such a large number of capacitors results in added intrication of the instrument and accordingly in deterioration of the performance reliability and an increase in the production cost of the instrument. The key-touch sensors being electrically connected to the keys by wires respectively intervening therebetween, disproportionately large amounts of time and labor are further required for the wiring and adjustment of the sensors and the associated elements.

Attempts have thus far been made to provide solutions to these problems inherent in electronically operated key-type instruments of the described type, one of which attempts is disclosed in Japanese Provisional Patent Publication No. 56-161594. In this published material is disclosed a sound-volume control device using a single key-touch counter common to all of the keys of the instrument. The single key-touch counter is assigned in time sharing to the individual keys of the instrument and counts the duration of the fly-state of each of the keys depressed to indicate the detected duration in the form of digital signals. The counting of the durations of key-fly states is effected only during the elementary cycles of operation of each machine cycle of a key assigner when the bus line is maintained out of use.

A control device of this nature still has a drawback in that the key-touch counter must be arranged with extra retrieval means to convert the results of the counting into appropriate key-touch values which vary with the counts.

An object of the present invention is to provide a key-touch value control device which is constructed and arranged so that key touch values are calculated in such a manner as to follow a characteristic curve which can be modified by modifying the configuration of operation command data and that such calculation is executed on a real time basis during the periods of time for which keys are being depressed. The operation command data can thus be modified without monitoring the periods of time for which keys are being depressed and, for this reason, the key-touch value control device can be constructed compactly since no such means need be provided that would otherwise be required for monitoring the durations of key-fly states and converting the resultant signals into key-touch values to follow a desired characteristic curve.

SUMMARY OF THE INVENTION

In accordance with the present invention, there is provided a key-touch value control device for an electronically operated musical instrument operative to produce sound with a variable volume and including a series of keys each having a key-off state wherein no finger pressure is applied, a key-on state wherein a key is fully depressed under a pressure manually applied to the key and a key-fly state wherein a key is moving from the key-off state toward the key-on state at a variable velocity, comprising key-state signal generating means operative to detect the state of each of the keys and to produce a succession of key-state signals each of indicative of one of the key-on state, key-off state and key-fly state of the key, and key-touch value calculating means operative to calculate, in response to each of the key-state signals, a key-touch value signal which is variable with the velocity at which the key is being depressed toward the key-on state and which is representative of the volume of the sound to be produced after the key has reached the key-on state, wherein the key-touch value calculating means comprises (1) key-fly state detecting means operative to detect from each of the key-state signals from the key-state signal generating means the key-fly state of selected one of the keys and to produce key-fly data indicating that the aforesaid selected one of the aforesaid keys is in the key-fly state, (2) operation command data memory mean having addresses at which operation command data indicative of various time durations consisting of successive different numbers of cycles of operation are stored, each of the aforesaid time durations ending upon the termination of the last one of the successive cycles of operation providing the particular time duration, (3) key-touch value memory means having addresses at which key-touch value data indicative of key-touch values are stored for individual cycles of operation, the addresses of the key-touch value memory means being respectively assigned to the individual keys of the instrument, (4) operation command data read-out control means responsive to the key-fly data produced by the key-fly state detecting means and operative to read the operation command data stored in the memory means at the address specified by the key-touch value data read from the key-touch value memory means, the operation command data being read by the operation command data read-out control means in response to the key-fly data produced by the key-fly state detecting means, (5) key-touch value maintaining means responsive to the operation command data read out from the operation command data memory means and operative to monitor the lapse of any of aforesaid time durations that is specified by the operation command data and to provide the operation command data read-out control means with end-of-duration data upon lapse of the particular time duration, the operation command data read-out control means being responsive to the end-of-duration data and being further operative to interrupt the reading of the data from the operation command data memory means until the end-of-duration data is produced by the key-touch value maintaining means after the operation command data has been read from the operation command data memory means at each of the addresses thereof, and (6) key-touch value subtracting means responsive to the data read out from the operation command data memory means and operative to subtract a predetermined quantity from the key-touch value represented by the data stored in the key-touch value memory means at the address corresponding to the aforesaid selected one of the aforesaid keys.

In another preferred embodiment of the present invention, there is provided a key-touch value control device for an electronically operated musical instrument operative to produce sound with a variable volume and including a series of keys each having a key-off state wherein no finger pressure is applied, a key-on state wherein a key is fully depressed under the pressure manually applied to the key and a key-fly state wherein a key is moving from the key-off state toward the key-on state at a variable velocity, comprising key-state signal generating means operative to detect the state of each of the keys and to calculate a succession of key-state signals each indicative of one of the key-on state, key-off state and key-fly state of the key, and key-touch value calculating means operative to calculate, in response to each of the key-state signals, a key-touch value signal which is variable with the velocity at which the key is being depressed toward the key-on state and which is representative of the volume of the sound to be produced after the key has reached the key-on state, wherein the key-touch value calculating means comprises (1) key-fly state detecting means operative to detect from each of the key-state signals from the key-state signal generating means the key-fly state of selected one of the keys and to produce key-fly data indicating that the aforesaid selected one of the aforesaid keys is in the key-fly state, (2) operation command data memory means having addresses at which operation command data indicative of various time durations consisting of successive different numbers of cycles of operation are stored, each of the aforesaid time durations ending upon the termination of the last one of the successive cycles of operation providing the particular time duration, (3) key-touch value memory means having addresses at which key-touch value data indicative of key-touch values are to be memorized for individual cycles of operation, the operation command data stored in the operation command data memory means consisting of data updating data including a flag element and duration sustain data including a flag element, the addresses of the key-touch value memory means being respectively assigned to the individual keys of the instrument, (4) operation command data discriminating means operative to determine, in accordance with the flag element included in the operation command data read out from the operation command data memory means, whether the operation command data is the data updating data or the duration sustain data and to produce update command data or duration sustain command data when the operation command data is found to be the data updating data or the duration sustain data, respectively, (5) operation command data read-out control means operative to read the operation command data stored in the operation command data memory means at the address specified by the key-touch value data read from the key-touch value memory means, the operation command data being read by the operation command data read-out control means in response to the key-fly data produced by the key-fly state detecting means, (6) key-touch value updating means responsive to the data update command data from the operation command data discriminating means and operative to update the key-touch value data currently stored in the key-touch value memory means into the operation command data read out from the operation command data memory means, (7) key-touch value maintaining means operative to produce subtraction command data responsive to the duration sustain command data from the operation command data discriminating means and to monitor the lapse of any of aforesaid time durations that is specified by the duration sustain data currently read from the process operation command data memory means for supplying end-of-duration data to the operation command data read-out control means upon the lapse of the any of aforesaid time durations that is specified by the duration sustain data, the operation command data read-out control means being responsive to the end-of-duration data and being further operative to interrupt the reading of the data from the operation command data memory means until the end-of-duration data is produced by the key-touch value maintaining means after the duration sustain command data has been supplied from the operation command data discriminating means at each of the address thereof, and (8) key-touch value subtracting means responsive to the subtraction command data read out from the key-touch value maintaining means and operative to subtract a predetermined quantity from the key-touch value represented by the data currently stored in the key-touch value memory means at the address corresponding to the aforesaid one of the aforesaid keys.

BRIEF DESCRIPTION OF THE DRAWINGS

The features and advantages of a key-touch value control device according to the present invention will be more clearly appreciated from the following description taken in conjunction with the accompanying drawings in which:

FIG. 5 is a view tabulating the data which may be stored in an operation command data memory and loaded into a time duration memory in the key-touch value control device illustrated in FIG. 1;

FIG. 9 is a view tabulating the data which may be stored in an operation command data memory and loaded into a duration sustain memory in the key-touch value control device implementing the embodiment illustrated in FIG. 6.

DESCRIPTION OF THE PREFERRED EMBODIMENTS

Embodiments of a key-touch value control device according to the present invention will be hereinafter described with reference to the drawings. As has been described, each of the embodiments herein shown is to be used for the control of sound volumes of an electronically operated key-type musical instrument (hereinafter referred to as musical instrument or simply as instrument) the mechanical construction of which per se is well known in the art.

Figure 1:
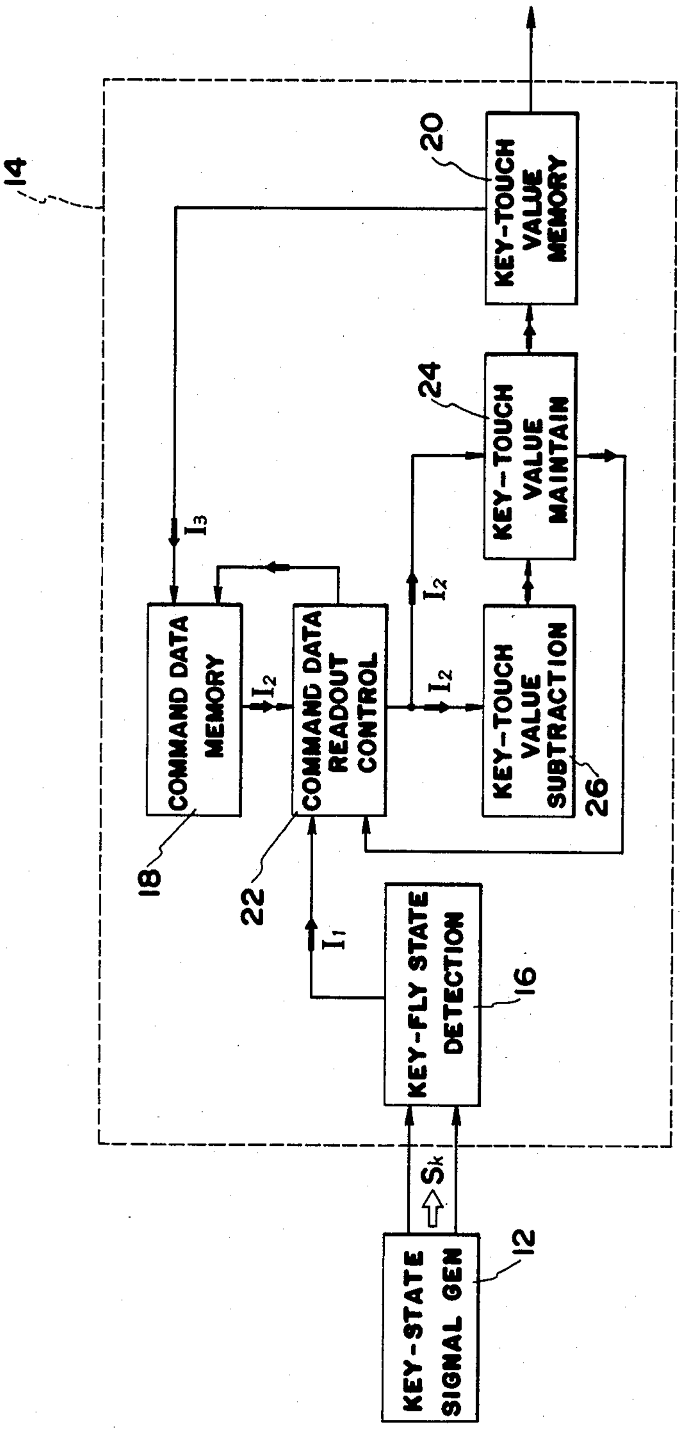
FIG. 1 is a block diagram showing a preferred embodiment of a key-touch value control device according to the present invention.

Referring first to FIG. 1 of the drawings, a key-touch value control device embodying the present invention largely consists of key-state signal generating means 12 and touch value calculating means 14. The key-state signal generating means 12 comprises a series of key touch response elements respectively associated with the keys of a musical instrument and are operative to detect the states of the respectively associated keys and to produce a succession of key-state signals $S_k$. Each of these key-state signals $S_k$ is indicative of one of the previously mentioned three different states of the associated key of the instrument, viz., the key-on state, key-off state and key-fly state of the key. The key-state signals $S_k$ are supplied in succession to the key-touch value calculating means 14. The key-touch value calculating means 14 is operative to calculate, in response to and during the key-fly state of a key being depressed, a key-touch value signal which is variable with the velocity at which the particular key is being depressed toward the key-on state and which is representative of the volume of the sound to be produced after the key has reached the key-on state.

In the embodiment shown in FIG. 1, the key-touch value calculating means 14 to achieve these functions comprises key-fly state detecting means 16 operative to detect from each of the key-state signals $S_k$ supplied from the key-state signal generating means 12 the key-fly state of a selected key of the instrument and to produce key-fly data $I_1$ indicating that the selected key is in the key-fly state. The key-touch value calculating means 14 further comprises operation command data memory means 18 to have memorized at the individual addresses thereof operation command data $I_2$ indicative of various time durations consisting of different numbers of cycles of operation, and key-touch value memory means 20 to have memorized at the individual addresses thereof key-touch value data $I_3$ indicative of key-touch values for individual cycles of operation. The addresses of the key-touch value memory means 20 are respectively assigned to the individual keys of the instrument. The data $I_3$ read from the key-touch value memory means 20 are used as addresses for access to the data $I_2$ stored in the operation command data memory means 18. In response to and throughout the presence of the key-fly data $I_1$ produced by the key-fly state detecting means 16, the operation command data $I_2$ stored in the memory means 18 are read out by operation command data read-out control means 22 at the address of the memory means 18 specified by the key-touch value data $I_3$ read from the key-touch value memory means 20.

The key-touch value calculating means 14 of the embodiment shown in FIG. 1 further comprises key-touch value maintaining means 24 which is responsive to the operation command data $I_2$ read out from the operation command data memory means 18 and which is operative to monitor the lapse of the time duration specified by the data $I_2$ and to produce end-of-duration data $I_4$ upon lapse of the particular time duration. The operation command data read-out control means 22 is responsive to this end-of-duration data $I_4$ and is further operative to interrupt the reading of the data $I_2$ from the operation command data memory means 18 until the end-of-duration data $I_4$ is produced by the key-touch value maintaining means 24 after the operation command data $I_2$ has been read from the operation command data memory means 18 at each of the address thereof. Further provided as part of the key-touch value calculating means 14 is key-touch value subtracting means 26 which is responsive to the data $I_2$ read out from the operation command data memory means 18 and which is operative to subtract a predetermined quantity such as a binary number of 1 from the key-touch value represented by the data $I_3$ stored in the key-touch value memory means 20 at the address corresponding to the selected key.

Figure 2:
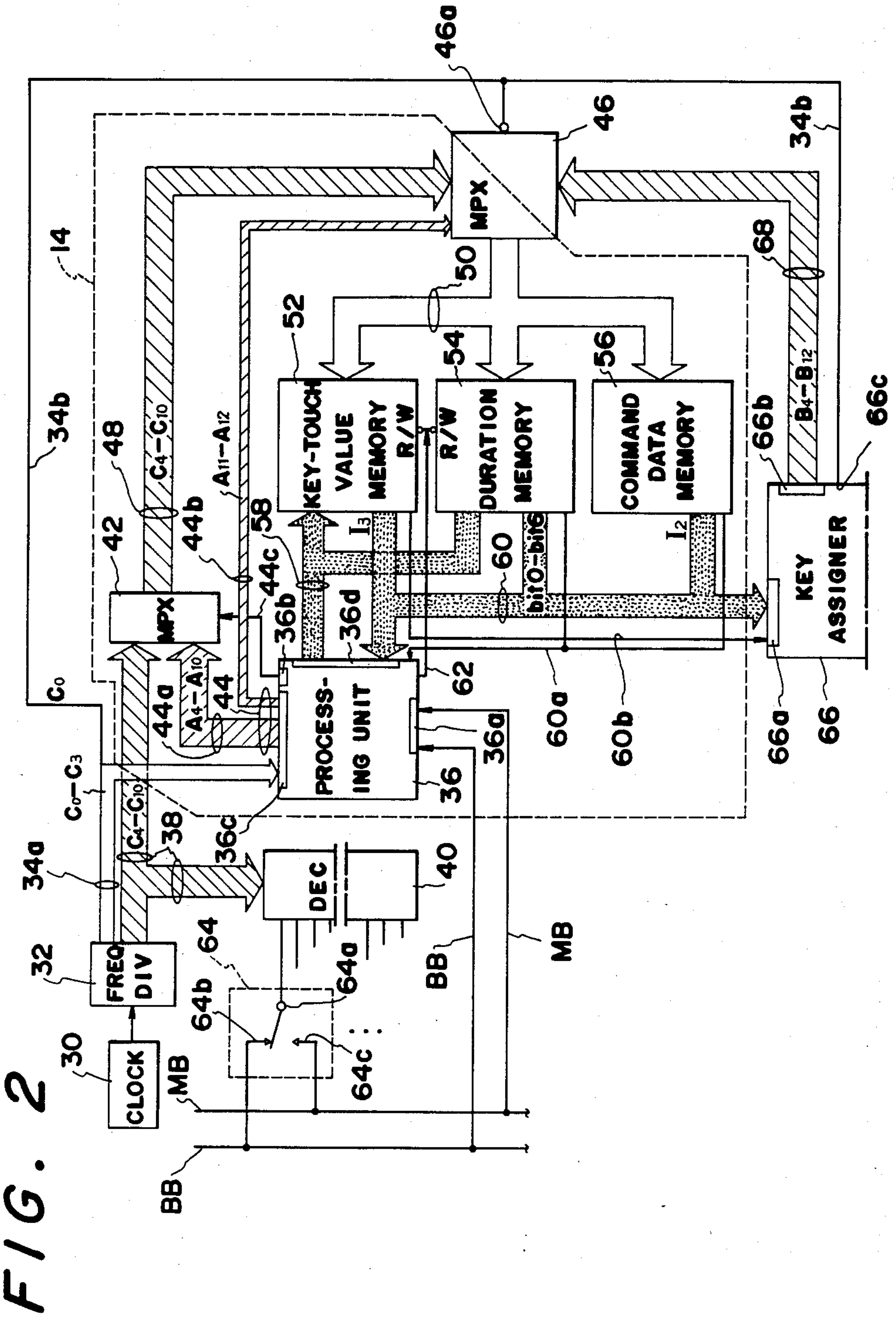
FIG. 2 is a block diagram showing the circuit arrangement of the embodiment illustrated in FIG. 1.

FIG. 2 of the drawings shows the circuit arrangement of the key-touch value control device largely constructed as above described. Referring to FIG. 2, the circuit arrangement includes a clock pulse generator 30 adapted to produce a train of clock pulses with a pulse-width of the order of 1 microsecond. These clock pulses are supplied to a frequency divider 32 which includes a cascade-connected eleven-stage binary circuit, though not shown in the drawings. Thus, the frequency divider 32 has a total of eleven output terminals which consist of an output terminal allocated to a least significant bit (LSB), output terminals respectively allocated to first to ninth bits, and an output terminal allocated to a most significant bit (MSB), though not shown. The output terminals allocated to the least significant bit and the first to third bits are respectively connected to a machine cycle signal bus 34*a* consisting of four signal lines to provide four-bit data to represent ten different operational states as will be described. The machine cycle signal bus 34*a* leads to clock signal terminals of a processing unit 36, and one of the lines forming the bus 34*a*, viz., the line which leads from the output terminal allocated to the least significant bit in particular has an extension forming a clock signal line 34*b*. The processing unit 36 consists of a microcomputer and has an input port 36*a*, an output port 36*b* and first and second input/output ports 36*c* and 36*d* as shown, the above mentioned clock signal terminals of the processing unit 36 forming part of the first input/output port 36*c*. On the other hand, the output terminals of the frequency divider 32 which are allocated to the fourth to ninth bits and the most significant bit are connected to an address bus 38 consisting of seven address signal lines. The address bus 38 leads on one hand to address signal terminals of a decoder 40 and on the other hand to a first set of input terminals of a first multiplexer 42.

An address bus 44 leads from the first input/output port 36*c* of the processing unit 36 and consists of a first set of address signal lines 44*a* respectively allocated to seven lower bits and a second set of address signal lines 44*b* respectively allocated to two upper bits. The first group of address signal lines 44*a* are connected to a second set of input terminals of the first multiplexer 42 and the second group of address signal lines 44*b* are connected to a first set of input terminals of a second multiplexer 46. The first multiplexer 42 has output terminals respectively connected to an address bus 48 consisting of seven address signal lines which, together with the two address signal lines 44*b* leading from the first input/output port 36*c* of the processing unit 36, lead to a first group of input terminals of the second multiplexer 46. The first multiplexer 42 further has a control signal terminal connected to a control signal line 44*c* which leads from the output port 36*b* of the processing unit 36 as shown so that an address signal X of logic "0" or "1" is supplied from the processing unit 36 to the control signal terminal of the multiplexer 42. The first multiplexer 42 is operative to allow the first set of input terminals to connect to the output terminals thereof in the presence of an address signal X of the logic "0" state and allow the second set of input terminals to connect to the output terminals thereof in the presence of an address signal X of the logic "1" state. The above mentioned second multiplexer 46 has a set of output terminals connected via an address bus 50 to the address signal terminals of each of a key-touch value memory 52, a time duration memory 54 and a operation command data memory 56. The second input/output port 36*d* of the processing unit 36 is connected via an output data bus 58 to a set of input terminals of the key-touch value memory 52 and to a set of output terminals of the time duration memory 54. Each of these key-touch value memory 52, time duration memory 54 and operation command data memory 56 has a total of eight output terminals consisting of an output terminal allocated to a least significant bit and seven output terminals allocated to first to seventh bits of the data stored in the memory. The seventh bit of the data stored in the key-touch value memory 52 is to be used as a flag bit assigned to a key-on state of a key. The seven output terminals allocated to the least significant bit and the first to sixth bits of each of the memories 52, 54 and 56 are connected to an input data bus 60 which leads to the second input/output port 36*d* of the processing unit 36. Each of the output data bus 58 and the input data bus 60 thus consists of seven data lines respectively allocated to the least significant bit and the first to sixth bits of the data stored in each of the key-touch value memory 52, time duration memory 54 and operation command data memory 56. The output terminals allocated to the seventh bits of the data stored in the key-touch value memory 52, time duration memory 54 and operation command data memory 56 is connected to the processing unit 36 through a first seventh-bit signal line 60*a*. Furthermore, the key-touch value memory 52 and the time duration memory 54 have read/write shift control terminals connected to a control signal line 62 leading from the processing unit 36. The processing unit 36, first and second multiplexers 42 and 46, key-touch value memory 52, time duration memory 54 and operation command data memory 56 as above described constitute in combination the key-touch value calculating means 14 in the first preferred embodiment of a key-touch value control device according to the present invention as described with reference to FIG. 1. The key-touch value memory 52 in particular constitutes the key-touch value memory means 20 in the key-touch value calculating means 14 shown in FIG. 1 and thus the data memorized therein as the previously mentioned key-touch value data $I_3$ are to be used in accessing the addresses of the operation command data memory 56 as will be described in more detail. As will also be described, the operation command data memory 56 has stored at the individual addresses thereof data representative of various time durations consisting of different numbers of cycles of operation. Thus, the operation command data memory 56 constitutes the previously mentioned operation command data memory means 18 in the key-touch value calculating means 14 shown in FIG. 1. The addresses of the operation command data memory 56 are accessed by the data read from the key-touch value memory 52 at the addresses respectively assigned to selected keys of the instrument and the data thus read from the operation command data memory 56 as the previously mentioned operation command data $I_2$ are to be written into the time duration memory 54 at the addresses respectively corresponding to the addresses accessed in the key-touch value memory 52.

The decoder 40 has output terminals respectively connected to a number of key-touch response elements which constitute the previously mentioned key-state signal generating means 12 of the arrangement shown in FIG. 1 and which are represented by a touch response element 64 for simplicity of illustration. The individual touch response elements 64 are associated with the individual keys, respectively, of a musical instrument (not shown) and are thus provided in a number equal to the number of the keys incorporated in the instrument. For purposes of description, it is herein assumed that the musical instrument incorporating the key-touch value control device embodying the present invention has no more than 128 keys and accordingly the number of the touch response elements 64 is 128 or less. Each of the touch response elements 64 is composed of a key switch consisting of a movable contact 64*a*, connected to one output terminal of the decoder 40, and a pair of stationary contacts 64*b* and 64*c*. One stationary contact 64*b* is a breaking contact and is connected to a braking bus bar BB and the other stationary contact 64*c* is a making contact and is connected to a making bus bar MB. Each of these breaking and making bus bars BB and MB is thus connected to the touch response elements 64 associated with all the keys of the instrument and is further connected to the input port 36*a* of the processing unit 36. The movable contact 64*a* of each touch response element 64 is responsive to the stroke of the key associated with the particular touch response element 64 and is held in a position connected to the braking contact 64*b* when the associated key is maintained in the key-off state thereof.

The key-touch value control device embodying the present invention further comprises a key assigner 66 which consists of a microcomputer and which has an input port 66*a*, an output port 66*b* and a clock signal terminal 66*c*. The previously mentioned input data bus 60 originating in the key-touch value memory 52, time duration memory 54 and operation command data memory 56 leads not only to the second input/output port 36*c* of the processing unit 36 but also to the input port 66*a* of this key assigner 66. To the input port 66*a* of the key assigner 66 is further connected a second seventh-bit signal line 60*b* which is formed by an extension from the output terminal allocated to the seventh bit in the key-touch value memory 52. The key assigner 66 further has its output port 66*b* connected to a second set of input terminals of the second multiplexer 46 via a selection address bus 68 and its clock signal port 66*c* connected to the clock signal line 34*b* leading from the output terminal of the frequency divider 32 which is allocated to the least significant bit. The signal line 34*b* is connected not only to the clock signal port 66*c* of the key assigner 66 but also to a clock signal terminal 46*a* of the second multiplexer 46 as shown.

In operation, clock pulses are supplied in succession from the clock pulse generator 30 to the frequency divider 32 and are frequency divided into pulses having eleven different cycles by means of the cascade-connected eleven-stage binary circuit incorporated in the divider 32. Thus, the frequency divider 32 delivers eleven bits of parallel pulse signals $C_0$, $C_1$, $C_2$, . . . $C_{10}$ of which the pulse signal $C_0$ corresponding to the least significant bit advances in synchronism with the clock pulses supplied to the cascade-connected eleven-stage binary circuit. Of these eleven bits of pulse signals $C_0$, $C_1$, $C_2$, . . . $C_{10}$ appearing respectively at the output terminals of the frequency divider 32, the pulse signals $C_0$ to $C_3$, . . . $C_{10}$ corresponding to the lower four bits are supplied by way of the machine cycle signal lines 34*a* to the first input/output port 36*c* of the processing unit 36 and the pulse signals $C_4$ to $C_{10}$ corresponding to the upper seven bits are supplied through the address signal lines 38 on one hand to the address signal terminals of the decoder 40 and on the other hand to the first set of input terminals of the first multiplexer 42. The decoder 40 decodes the pulse signals $C_4$ to $C_{10}$ and produces a seven-bit status word during each of the clock pulses supplied from the clock pulse generator 30. The seven bit status words thus produced in synchronism with the clock pulses are distributed sequentially to the 128 or less touch response elements 64 so that one of the touch response elements 64 is selected during each clock pulse. A key pulse in the form of, for example, a logic "0" is thus supplied from the decoder 40 to one of the touch response elements 64 during each clock pulse. The key pulse has a duration which corresponds to one of the "time slots" which are respectively allocated by the decoder 40 to the individual touch response elements 64.

In response to and throughout the duration of the key pulse thus suppled from the decoder 40, the selected one of the touch response elements 64 predominates over the states of the breaking and making bus bars BB and MB. If, in this instance, the key associated with the selected touch response element 64 is held in the key-off state, the movable contact 64*a* of the touch response element 64 is connected to the breaking contact 64*b* and maintains the breaking and making bus bars BB and MB in logic "0" and "1" states, respectively. If, on the other hand, the key associated with the selected touch response element 64 is in the key-fly state transitive from the key-off state to the key-on state, the movable contact 64*a* of the touch response element 64 is located between the breaking and making contacts 64*b* and 64*c* and maintains both of the breaking and making bus bars BB and MB in the respective logic "1" states thereof. When the key associated with the selected touch response element 64 is in the key-on state, the movable contact 64*a* of the touch response element 64 is located in contact with making contact 64*c* and maintains both of the breaking and making bus bars BB and MB in the respective logic "1" and "0" states thereof.

Thus, the breaking and making bus bars BB and MB are enabled to supply the input port 36*a* of the processing unit 36 with key-state signals $S_k$ indicative of the states (the key-off, key-on and key-fly states) of the individual keys of the instrument at time intervals corresponding to the time slots allocated to the touch response elements 64 by the decoder 40, viz., the durations of the key pulses supplied from the decoder 40. Also supplied from the bus bars BB and MB to the input port 36*a* of the processing unit 36 are pieces of information specifying the key or keys in the key-fly states by the time slot or slots allocated to the key-touch response element or elements 64 associated with the particular key or keys. The details of the manners in which the keystate signals $S_k$ and such pieces of information are to be produced may be understood from the teachings of Japanese Provisional Patent Publication No. 56-341594.

Figure 3:
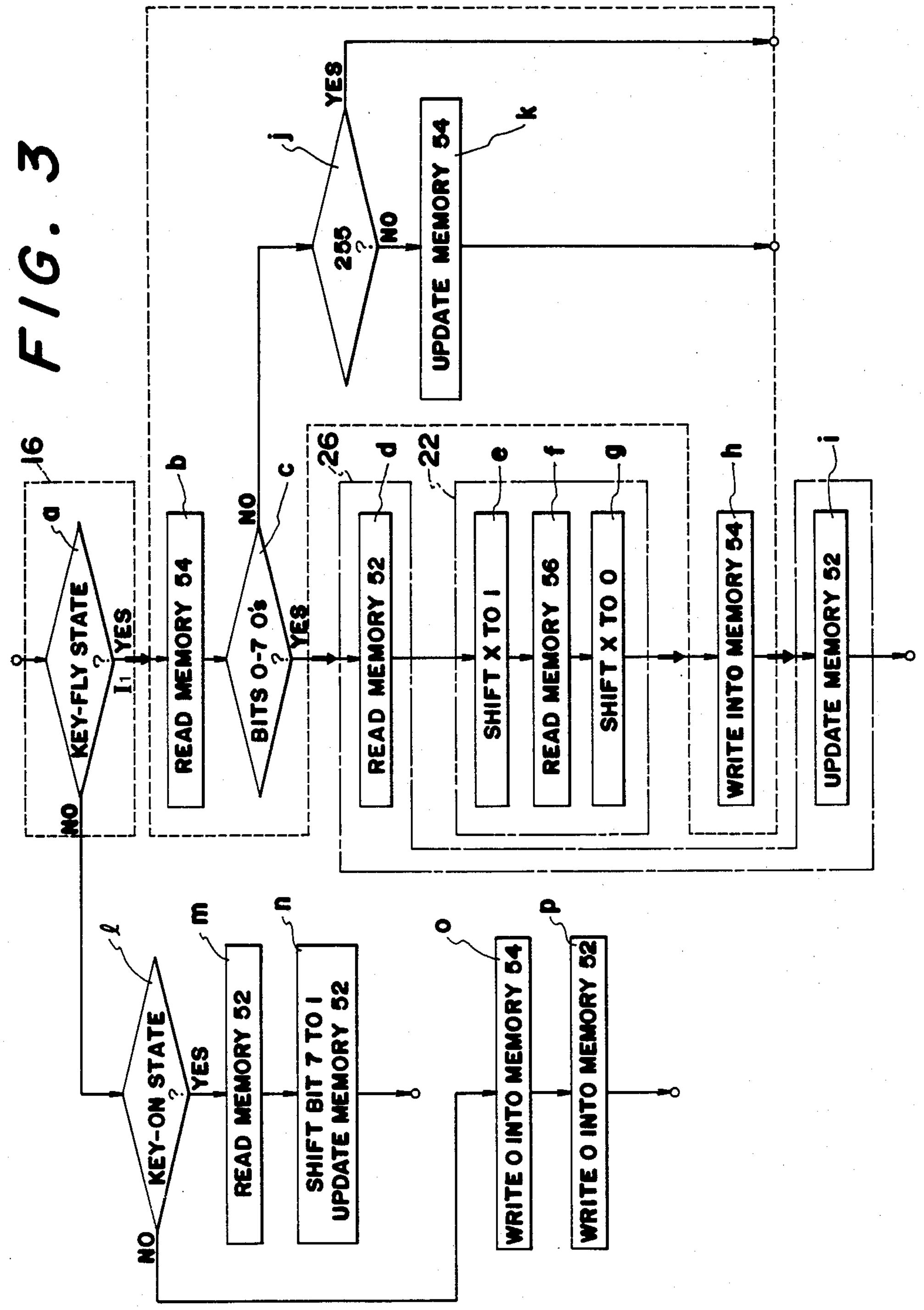
FIG. 3 is a flowchart showing the program in accordance with which the key-touch value control device shown in FIG. 2 is to operate.

In response to the key-state signals $S_k$ and the pieces of information specifying the key or keys in the key-fly states, the processing unit 36 executes the operation to calculate the key-touch values in accordance with the program indicated by the flowchart of FIG. 3. Thus, the processing unit 36 constitutes the previously mentioned touch value calculating means 14 forming part of the basic arrangement shown in FIG. 1. For this purpose, the processing unit 36 first determines, on the basis of the key-state signal $S_k$ received by the input port 36*a* thereof, whether or not the key associated with the touch response element 64 to which a certain time slot is allocated by the decoder 40 is in the key-fly state as at step a of the flowchart shown in FIG. 3. If the answer in the step a is in the affirmative "YES", the processing unit 36 delivers key-fly state data $I_1$ indicating that the key associated with the touch response element 64 to which the particular time slot is allocated is in the key-fly state. This step a implements the previously mentioned key-fly state detecting means 16 of the arrangement described with reference to FIG. 1. In this instance, the processing unit 36 supplies a read operation command data signal to the read/write shift control terminal of the time duration memory 54 through the read/write control signal line 62. Thus, the processing unit 36 reads, through the input data bus 60 and the first seventh-bit signal line 60*a*, eight-bit data from the time duration memory 54 at the address corresponding to the key the status of which is represented by the key-state signal $S_k$ currently appearing at the input port 36*a* of the processing unit 36. This step is indicated as step b in FIG. 3. On the basis of the eight-bit data thus read from the time duration memory 54 through the data bus 60 and the seventh-bit signal line 60*a*, the processing unit 36 determines whether or not all of the eight bits included in the data are 0's, as at step c in the flowchart of FIG. 3. If it is found that all of the eight bits read out from the memory 54 are 0's, the processing unit 36 delivers end-of-duration data $I'_4$ for the purpose to be described later. Under this condition, there is an address signal X of the logic "0" state appearing on the control signal line 44*c* leading from the output port 36*b* of the processing unit 36 to the control signal terminal of the first multiplexer 42. The first multiplexer 42 is thus held in a condition allowing the first set of input terminals to connect to the output terminals of the multiplexer so that the pulse signals $C_4$ to $C_{10}$ on the address bus 38 are selectively passed to the address bus 48 through the first set of input terminals of the multiplexer 42. Accordingly, the pulse signals $C_4$ to $C_{10}$ corresponding to the upper seven bits supplied from the frequency divider 32 are supplied not only to the decoder 40 as described above but also to the first set of input terminals of the second multiplexer 46 and through the multiplexer 46 and the address bus 50 to each of the key-touch value memory 52, time duration memory 54 and operation command data memory 56. Thus, only the information for the key associated with the touch response element 64 selected by the decoder 40, or in other words, only the data stored at the address which corresponds exclusively to the key the status of which is represented by the key-state signal $S_k$ currently present at the input port 36*a* of the processing unit 36 is read from the time duration memory 54 by means of the processing unit 36. The function of the processing unit 36 to determine whether or not a given key of the instrument is in the key-fly state provides the key-fly state detecting means 16 in the first preferred embodiment of a key-touch value control device according to the present invention as described with reference to FIG. 2.

The technique to realize the time-sharing multiplexed transmission of the information pertaining to each of a plurality of keys and the technique to access the addresses of a memory progressively and assigning each address to a key in synchronism with the assignment of the keys to the time slots in the time-sharing multiplexed transmission mode are disclosed in, for example, Japanese Provisional Patent Publication No. 56-155995.

Operation is executed in the processing unit 36 for each of the keys in accordance with the program shown by the flowchart of FIG. 3. The flowchart of FIG. 3 thus shows a series of steps to be taken by the processing unit 36 for each of the keys of the instrument.

The read operation command data signal appearing at the read/write control signal line 62 leading from the processing unit 36 is also fed to the read/write shift control terminal of the key-touch value memory 52. When it is found that all of the eight bits included in the data read from the time duration memory 54 are 0's as previously noted, the processing unit 36 reads, through the input data bus 60 and the seventh-bit signal line 60*a*, eight-bit data $I_3$ from the key-touch value memory 52 at the address assigned to the key which is currently in the key-fly status, viz., the key the status of which is represented by the key-state signal $S_k$ currently appearing at the input port 36*a* of the processing unit 36. This step is shown as step d in FIG. 3. The processing unit 36 then shifts the address signal X from the logic "0" state to the logic "1" state at its output port 36*b* as at step e in FIG. 3. In the presence of the address signal X of the logic "1" state at the control signal terminal 44*c* of the first multiplexer 42, the second set of input terminals of the multiplexer 42 are now allowed to connect to the output terminals of the multiplexer. Thus, the address signals $A_4$ to $A_{10}$ supplied from the first input/output port 36*c* of the processing unit 36 to the address signal lines 44*a* are passed through the second multiplexer 42 and by way of the address bus 48 to the second multiplexer 46 and further through the multiplexer 46 and via the address bus 50 to each of the key-touch value memory 52, time duration memory 54 and operation command data memory 56. On the basis of the eight-bit key-touch value information read from the key-touch value memory 52 through the input data bus 60 and the seventh-bit signal line 60*a* as at the step d in the flowchart of FIG. 3, the processing unit 36 determines the address at which eight-bit data $I_2$ is to be read from the operation command data memory 56 and reads such data $I_2$ from the memory 56 also through the input data bus 60 and the seventh-bit signal line 60*a* as at step f in FIG. 3. Thereafter, the processing unit 36 shifts the address signal X from the logic "1" state back to the logic "0" state as at step g in FIG. 3 so that the pulse signals $C_4$ to $C_{10}$ appear for a second time at the input terminals of each of the key-touch value memory 52, time duration memory 54 and operation command data memory 56 in place of the address signals $A_4$ to $A_{10}$. The above described functions of the processing unit 36 which are represented by the steps e to g in the flowchart of FIG. 3 provide the operation command data read-out control means 22 in the key-touch value calculating means 14 shown in FIG. 1. The data $I_2$ read out from the operation command data memory 56 by the processing unit 36 is supplied as the operation command data to the key-touch value maintaining means 24 shown in FIG. 1 as will be described later.

The operation command data $I_2$ read out from the operation command data memory 56 by the processing unit 36 is loaded, by way of the output data bus 58, into the time duration memory 54 at the address assigned to the key currently under consideration, as at step h in the flowchart of FIG. 3 and the above mentioned operation command data $I_2$ is also supplied to the key-touch value subtraction means 26 of the key-touch value calculating means 14 illustrated in FIG. 1 as will be also described in more detail. Thereupon, the processing unit 36 subtracts a binary number of 1 from the data $I_3$ read from the key-touch value memory 52 at the address assigned to the key under consideration and loads the updated data into the key-touch value memory 52 at the particular address of the memory 52 that is identical with the address read out, as at step i in the flowchart of FIG. 3. The operation is now terminated. The above described functions of the processing unit 36 which are represented by the steps d and i in the flowchart of FIG. 3 provide the key-touch value subtraction means 26 in the embodiment of a key-touch value control device according to the present invention as illustrated in FIG. 1.

If it is found in the step c shown in FIG. 3 that the memory content expressed by the eight bits (bit 0 to bit 7) read from the time duration memory 54 at the address corresponding to the key under consideration is neither "0" nor "255", the answer in the step c has turned to be in the negative "NO". If the answers in both of the steps i and j are in the negative "NO", the processing unit 36 subtracts a binary number of 1 from the eight-bit data read from the time duration memory 54 at the address corresponding to the key under consideration, thus updating the particular data to a minus-one version of the original data while maintaining the key-touch value data $I_3$ read from the key-touch value memory 52. This step is indicated as step k in the flowchart of FIG. 3. Thereafter, operation proceeds in accordance with the data $I_2$ read from the operation command data memory 56, maintaining a key-touch value unchanged until a key pulse is supplied to the particular touch response element 64 during the immediately subsequent cycle of operation. Upon lapse of the predetermined duration sustain period which is dictated by the operation command data, the data which has been read from the time duration memory 54 at the address corresponding to the key under consideration is diminished to 0 so that the answer in the step c in the flowchart of FIG. 3 turns affirmative "YES" and as a consequence the key-touch value maintaining means 24 delivers the end-of-duration data $I_4$ as previously discussed. The operation is now terminated.

When the key under consideration is depressed throughout its stroke and thus assumes the key-on state, the answer in the step a in the flowchart of FIG. 3 turns negative "NO" so that the processing unit 36 determines, on the basis of the key-state signal $S_k$ appearing at the input port 36*a* thereof, that the key-fly state of the particular key is now over, as at step 1 in the flowchart of FIG. 3. The data $I_3$ stored in the key-touch value memory 52 at the address corresponding to the key which has been under consideration is read from the memory 52 as at step m in FIG. 3, whereupon a logic "1" flag is raised at the seventh bit of the particular data. The data thus updated is memorized at the same address of the key-touch value memory 52 as at step n in the flowchart of FIG. 3 and the operation is brought to to an end.

When the key under consideration is thereafter released from finger pressure and assumes the key-off state, the answer in the step 1 in the flowchart of FIG. 3 turns negative "NO". The processing unit 36 then clears the data $I_3$ which have been memorized in the key-touch value memory 52 and the time duration memory 54 at the addresses corresponding to the key which has been under consideration as at steps o and p in the flowchart of FIG. 3, thereby putting an end to the operation for the particular key.

Figure 4:
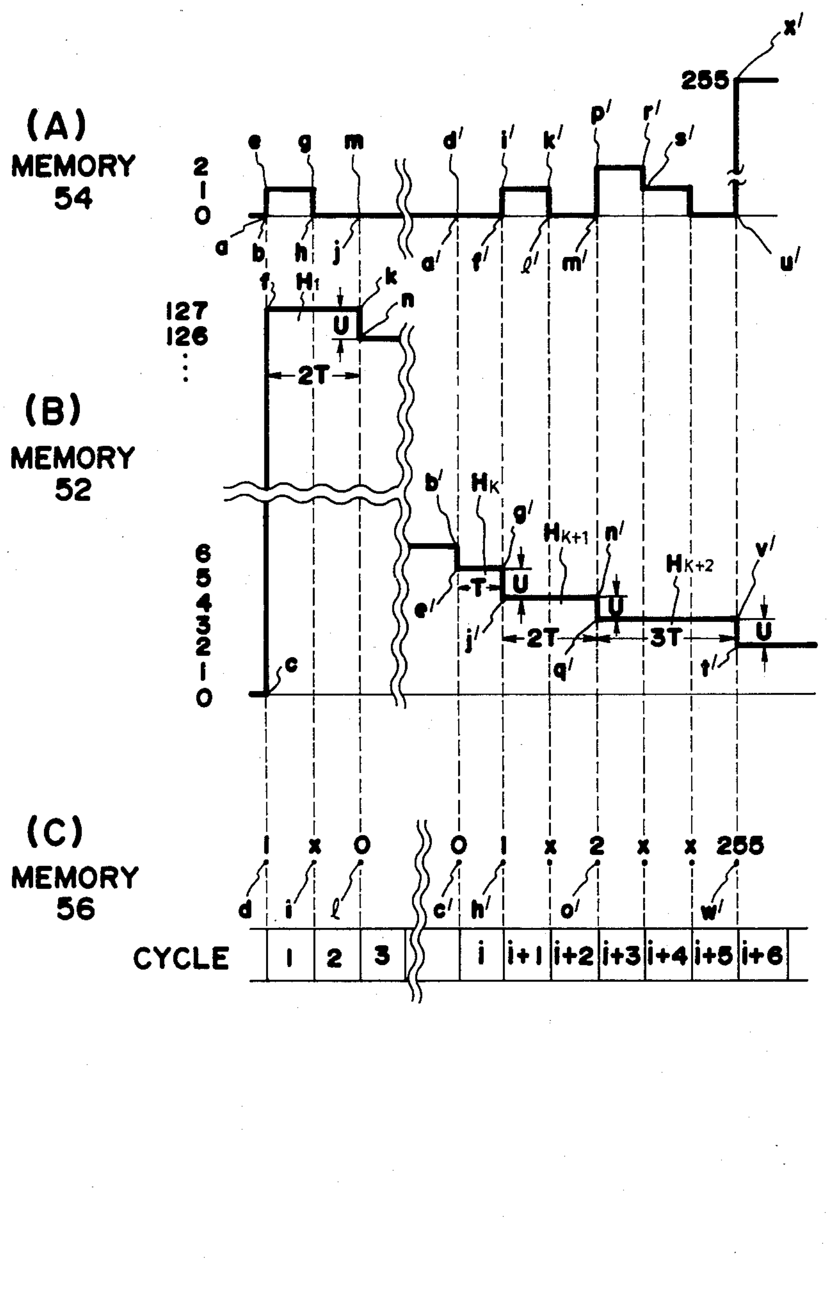
FIG. 4 is a view showing the logic states of the memory circuits included in the key-touch value control device illustrated in FIG. 2, wherein section (A) shows the decimal numbers represented by the logic states of the data in the time duration memory, section (B) shows decimal numbers represented by the logic states of the data in the key-touch value memory and section (C) shows the decimal numbers represented by the logic states of the data in the operation command data memory of the key-touch value control device illustrated in FIG. 2.

The operation of the key-touch value control device embodying the present invention will be hereinafter described more specifically with reference to FIGS. 1 to 3 and further to FIGS. 4 and 5. In FIG. 4, section (A) shows the numerical values represented by the logic states of the data in the time duration memory 54, section (B) shows the numerical values represented by the logic states of the data $I_3$ in the key-touch value memory 52 and section (C) shows the numerical values represented by the logic states of the data $I_2$ in the operation command data memory 56 of the key-touch value control device illustrated in FIG. 2. The stepped curve in thick lines in the section (B) of FIG. 4 indicates the functional relationships between the durations of key-fly states and the key-touch values to respectively correspond to the durations of the key-fly states during successive cycles of operation of the key-touch value control device shown in FIG. 2.

When the processing unit 36 determines that the key selected in a first cycle of operation is in the key-fly state on the basis of the key-state signal $S_k$ supplied thereto at the step a of the flowchart in FIG. 3, the unit 36 reads eight-bit data from the time duration memory 54 at the address corresponding to the particular key at the step b in FIG. 3 as previously discussed. The time duration memory 54 has been reset during the preceding cycle of operation and has stored therein data representative of a decimal number 0 as indicated at a in section (A) of FIG. 4. All of the eight bits included in the data read from the time duration memory 54 are thus 0's so that the answer in the step c in FIG. 3 is naturally in the affirmative "YES" as indicated at b in the section (A) of FIG. 4. The processing unit 36 then reads data $I_3$ from the key-touch value memory 52 at the address assigned to the key under consideration at the step d in FIG. 3. The key-touch value memory 52 has also been reset during the preceding cycle of operation and has stored therein data $I_3$ representative of the logic "0" state as indicated at c in section (B) of FIG. 4.

Data is then read by the processing unit 36 from the operation command data memory 56 at the address specified by the eight-bit data $I_3$ thus read out from the key-touch value memory 52 at the steps e to g in FIG. 3. The data $I_2$ read from the operation command data memory 56 is herein assumed to be in the form of "00000001" as indicated at d in section (C) of FIG. 4 and on row a in FIG. 5. Such data $I_2$ is loaded into the time duration memory 54 at the address assigned to the key under consideration at the step h shown in FIG. 3, as indicated at e in the section (A) of FIG. 4. Thereupon, the processing unit 36 subtracts a binary number of 1 from the data $I_3$ read from the key-touch value memory 52 at the address corresponding to the key under consideration and updates the data to $-1$ value for storage into the key-touch value memory 52 at the particular address of the memory 52 at the step i in FIG. 3, as indicated at f in the section (B) of FIG. 4. The seventh bit of the key-touch value data $I_3$ stored in the key-touch value memory 52 is used as the flag bit assigned to the key-on state as previously noted and, for this reason, the key-touch value represented by the key-touch value data $I_3$ is determined by the seven bits consisting of the least significant bit (bit 0) and the first to sixth bits (bit 1 to bit 6). When the initial key-touch value data $I_3$ is of the logic "0" state as indicated at c in the section (B) of FIG. 4, the data updated by subtraction of a binary number of 1 from the data consisting of the seven bits of "0" as above discussed is in the form of "01111111" which represents a decimal number of 127.

At the beginning of the immediately subsequent cycle of operation, the eight-bit data stored in the time duration memory 54 is of the logic representative of a decimal number of 1 as indicated at g in the section (A) of FIG. 4. In this instance, the answer in the step c and accordingly the answer in the step j in the flowchart of FIG. 3 are in the negative "NO" so that the data stored in the time duration memory 54 is updated by subtraction of a binary number of 1 therefrom at the step k in FIG. 3, as indicated at h in the section (A) of FIG. 4. The data in the time duration memory 54 being thus updated, the data $I_2$ stored in the operation command data memory 56 is not transferred to the time duration memory 54 during the second cycle of operation, as indicated at i in the section (C) of FIG. 4.

At the beginning of the third cycle of operation, the data stored in the time duration memory 54 is of the logic representative of the decimal number 0 as indicated at j in the section (A) of FIG. 4 so that the data $I_3$ read by the processing unit 36 from the key-touch value memory 52 at the step d in FIG. 3 represents the decimal number 127 as indicated at k in the section (B) of FIG. 4. The processing unit 36 then reads data $I_2$ from the operation command data memory 56 at the address specified by the data $I_3$ (decimal 127) read from the key-touch value memory 52 at the steps e to g in FIG. 3. The data $I_2$ thus read out from the operation command data memory 56 is assumed to be in the form of "00000000" as indicated at l in the section (C) of FIG. 4 and on row b in FIG. 5 and is written into the time duration memory 54 as indicated at m in the section (A) of FIG. 4. Thereupon, the processing unit 36 subtracts a binary number of 1 from the data $I_3$ stored in the key-touch value memory 52 as indicated at n in the section (B) of FIG. 4. Thus, the stepped curve of the section (B) showing the relationships between the durations of key-fly states and the key-touch values to respectively correspond to the durations of the key-fly states has a horizontal segment having a time duration 2T corresponding to the duration of two cycles of operation and a unit decrement U (a vertical segment) in logic value as indicated at $H_1$.

The cycles of operation proceed as above described and, during the ith cycle of operation, the data stored in the time duration memory 54 may be representative of the decimal number 0 as indicated at a' in the section (A) of FIG. 4 and the data $I_3$ stored in the key-touch value memory 52 may be representative of a decimal number of 6 as indicated at b' in the section (B) of FIG. 4. The data stored at the sixth address in the operation command data memory 56 is assumed to be in the form of "00000000" as indicated at c' in the section (C) of FIG. 4 and on row c of FIG. 5 so that data representative of the decimal number 0 is written into the time duration memory 54 as indicated at d' in the section (A) of FIG. 4. Thus, the key-touch value is diminished from 6 to 5 in terms of decimal number as indicated at e' in the section (B) of FIG. 4.

During the subsequent (i+1)th cycle of operation, the data stored in the time duration memory 54 is also representative of the decimal number 0 as indicated at f' in the section (A) of FIG. 4 and the data $I_3$ stored in the key-touch value memory 52 is representing a decimal number of 5 as indicated at g' in the section (B) of FIG. 4. The data $I_2$ stored at the fifth address in the operation command data memory 56 is assumed to be in the form of "00000001" as indicated at h' in the section (C) of FIG. 4 and on row d of FIG. 5 so that data $I_2$ of the logic state representative of a decimal number of 1 is written into the time duration memory 54 as indicated at i' in the section (A) of FIG. 4. Thus, the key-touch value is further diminished from 5 to 4 in terms of decimal number as indicated at j' in the section (B) of FIG. 4. The stepped curve of the section (B) of FIG. 4 now has a horizontal segment having a time duration T corresponding to the duration of one cycle of operation and the unit decrement U in logic value as indicated at $H_k$.

During the subsequent (i+2)th cycle of operation, the data stored in the time duration memory 54 is representative of a decimal number of 1 as indicated at k' in the section (A) of FIG. 4. Thus, a binary number of 1 is subtracted from the data stored in the time duration memory 54 as indicated at 1' in the section (A) of FIG. 4 and the key-touch value is maintained unchanged for a two cycle period.

During the (i+3)th cycle of operation, the data stored in the time duration memory 54 is representative of a decimal number of 0 as indicated at m' in the section (A) of FIG. 4 and the data $I_3$ stored in the key-touch value memory 52 is representing a decimal number of 4 as indicated at n' in the section (B) of FIG. 4. The data $I_2$ stored at the fourth address in the operation command data memory 56 is assumed to be in the form of "00000010" as indicated at o' in the section (C) of FIG. 4 and on row e of FIG. 5 so that data $I_2$ of the logic state representative of a decimal number of 2 is written into the time duration memory 54 as indicated at p' in the section (A) of FIG. 4. Thus, the key-touch value is diminished from 4 to 3 in terms of decimal number as indicated at q' in the section (B) of FIG. 4. The stepped curve of the section (B) of FIG. 4 now has a horizontal segment having a time duration 2T corresponding to the durations of two cycles of operation and the unit decrement U as indicated at $H_{k+1}$.

During the subsequent (i+4)th cycle of operation, the data stored in the time duration memory 54 is representative of a decimal number of 2 as indicated at r' in the section (A) of FIG. 4. Thus, a binary number of 1 is subtracted from the data stored in the time duration memory 54 as indicated at s' in the section (A) of FIG. 4 and the key-touch value is maintained unchanged for a three cycle period until the data stored in the time duration memory 54 is updated to the logic "0" state. At the beginning of the (i+6)th cycle of operation, the key-touch value is further diminished from 3 to 2 in decimal number. The stepped curve of the section (B) of FIG. 4 now has a horizontal segment having a time duration 3T corresponding to the durations of three cycles of operation and the unit decrement U as indicated at $H_{k+2}$.

As will have been understood from the foregoing description, the operation command data memory 56 has stored at the individual addresses thereof data $I_2$ representative of various time durations consisting of different numbers of cycles of operation. The addresses of the operation command data memory 56 are accessed by the data $I_3$ read from the key-touch value memory 52 at the addresses respectively assigned to selected keys of the instrument and the data $I_2$ thus read from the operation command data memory 56 are written into the time duration memory 54 at the addresses respectively corresponding to the addresses accessed in the key-touch value memory 52. A desired key-touch value is thus calculated on a real time basis during the key-fly state of a key and, at the point of time at which the key reaches the end of the stroke, the operation to calculate the key-touch value is terminated and the key-touch value data $I_3$ either updated or maintained in the key-touch value memory 52 is read out. A key-touch value can thus be obtained when the duration for which the particular has been in the key-fly state is translated in accordance with a predetermined key-touch value curve on the basis of the data thus read out.

During the above described operation it may happen that the key-fly state lasts for an exceptionally long period of time with the key depressed extremely slowly. When this occurs, the key-touch value data $I_3$ read from the key-touch value memory 52 may be updated an increased number of times (as at the step i of FIG. 3) and may thus be ultimately reduced to 0. In this instance, the key-touch value data $I_3$ expressed by the seven binary codes memorized in the key-touch value memory 52 at the address corresponding to the key under consideration will be recycled to 127 in decimal number and will continue to recycle thereafter. Such an inconvenience can be avoided if a minimum key-touch value is predetermined which corresponds to the state in which a key is depressed extremely slowly and a decimal number 255 is memorized into the operation command data memory 56 at the address of the number equal to the minimum key-touch value plus one. If the minimum key-touch value is determined to be two, then the particular value is thus memorized at the address three of the operation command data memory 56. In this instance, the above described operation is followed by the following steps.

During the (i+1)th step subsequent to the above described operation, the content of the operation command data memory 56 represents number 0 in decimal number (as indicated at u' in section (A) of FIG. 4). The number 3 is then read from the key-touch value memory 52. The content of the operation command data memory 56 at the address 3 thereof represents a bit sequence "1111111" (as indicated at w' in section (A) of FIG. 4 and in row f of FIG. 5). The data representative of the decimal number 255 is thus written into the duration memory 54 (as indicated at x' in section (A) of FIG. 4) and the key-touch value then diminishes from 3 to 2 (as indicated at t' in section (B) of FIG. 4). With the number 255 momorized in the duration memory 14 as above mentioned, the result of the decision step c of FIG. 3 must always be in the negative "NO" and the result of the decision step j of FIG. 3 must always be in the affirmative "YES". Thus, neither the operation can proceed beyond the step d of FIG. 3 to update the content of the key-touch value memory 52 to −1 value nor the operation can proceed to the step k of FIG. 3 to update the content of the key-touch value memory 52 to −1. The processing unit 36 is thus allowed to repeat the steps a to c of FIG. 3, with the key-touch value maintained at the minimum value 2.

Figure 6:
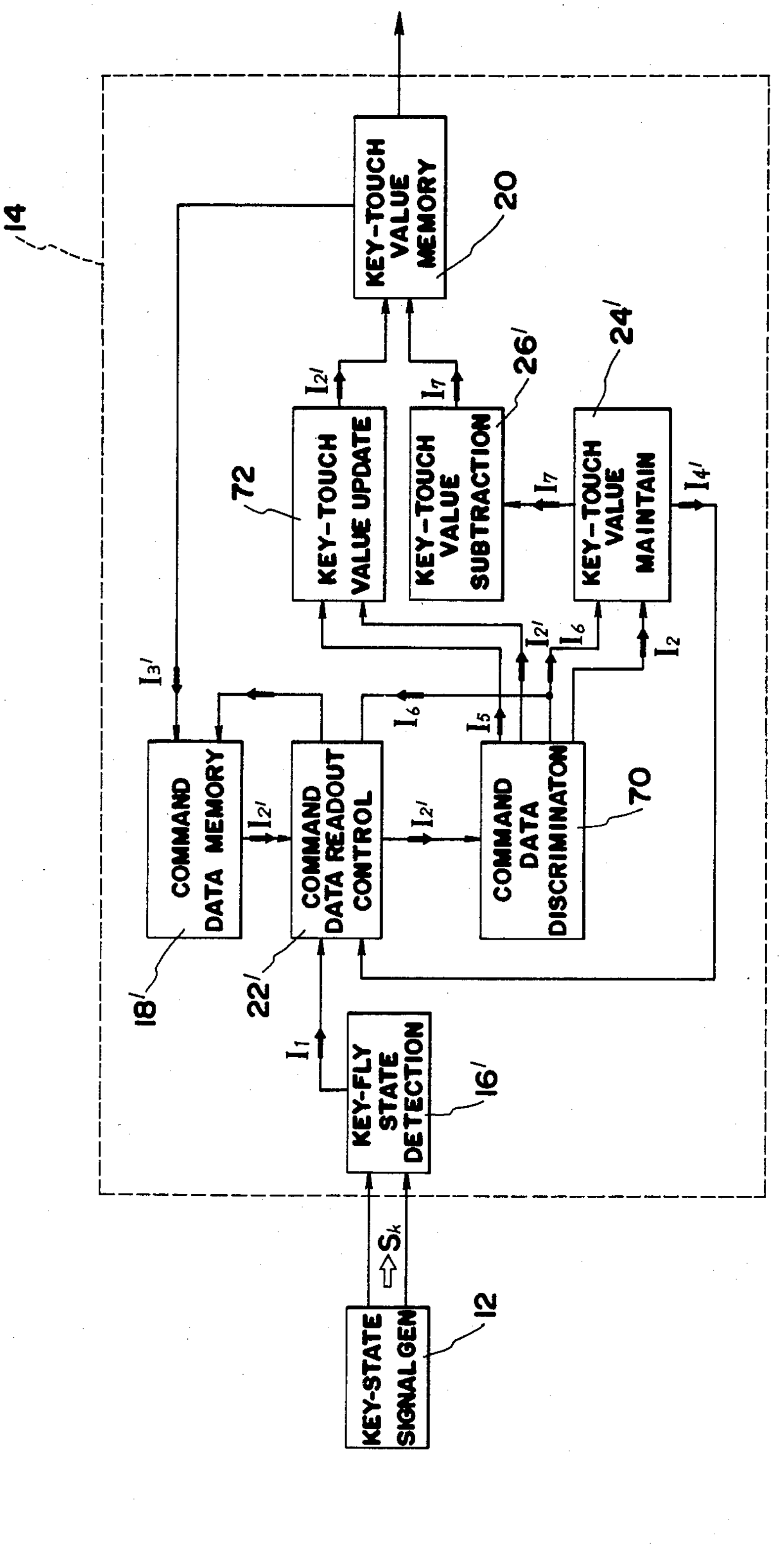
FIG. 6 is a block diagram similar to FIG. 1 but shows another preferred embodiment of a key-touch value control device according to the present invention.

FIG. 6 of the drawings shows another preferred embodiment of a key-touch value control device according to the present invention. The embodiment herein shown also largely consists of key-state signal generating means and key-touch value calculating means. The key-touch value calculating means, which is now denoted as 14', is similar to its counterpart in the embodiment of FIG. 1 and is constructed and arranged as described with reference to FIG. 2, thus producing a succession of key-state signals $S_k$ indicative of the key-on state, key-off state or key-fly states of selected keys. The key-state signals $S_k$ are supplied in succession to the key-touch value calculating means 14'.

In the embodiment shown in FIG. 6, the key-touch value calculating means 14' to achieve these functions comprises key-fly state detecting means 16' operative to detect from each of the key-state signals $S_k$ supplied from the key-state signal generating means 12 the key-fly state of a selected key of the instrument and to produce key-fly data $I_1'$ indicating that the selected key is in the key-fly state. The key-touch value calculating means 14' further comprises operation command data memory means 18' to have memorized at the individual addresses thereof operation command data $I_2'$ indicative of various time durations consisting of different numbers of cycles of operation, and key-touch value memory means 20' to have memorized at the individual addresses thereof key-touch , indicative of key-touch values for individual value data $I_3'$ indicative of key-touch values for individual cycles of operation. The operation command data $I_2'$ stored in the operation command data memory means 18' consists of data updating data including a flag element and duration sustain data including a flag element. The addresses of the key-touch value memory means 20' are respectively assigned to the individual keys of the instrument. Further provided is operation command data discriminating means 70 which is operative to determine, on the basis of the flag element included in the operation command data $I_2$ read out from the memory means 18', whether the operation command data $I_2$ is the data updating data or the duration sustain data and to produce update command data $I_5$ or duration sustain command data $I_6$ when the operation command data $I_2'$ is found to be the data updating data or the duration sustain data, respectively.

In response to and throughout the presence of the key-fly data $I_1'$ produced by the key-fly state detecting means 16', the operation command data $I_2'$ stored in the memory means 18' are read out by operation command data read-out control means 22' at the address of the memory means 18' specified by the key-touch value data $I_3'$ read from the key-touch value memory means 20'.

The key-touch value calculating means 14' of the embodiment shown in FIG. 6 further comprises key-touch value maintaining means 24' operative to produce subtraction command data $I_7$ responsive to the duration sustain command data $I_6$ from the operation command data discriminating means 70 and to monitor the lapse of the time duration specified by the duration sustain data $I_2$ currently read from the process operation command data memory means 18', supplying end-of-duration data $I_4$ to the operation command data read-out control means 22' upon the lapse of the time duration represented by the duration sustain data $I_2$. The key-touch value calculating means 14' further comprises key-touch value updating means 72 responsive to the data update command data $I_5$ read out from the operation command data discriminating means 70 and operative to update the key-touch value data $I_3'$ currently stored in the key-touch value memory means 20' into the operation command data $I_2'$ read out from the operation command data memory means 18. The operation command data read-out control means 22' is responsive to this end-of-duration data $I_4'$ and is further operative to interrupt the reading of the data $I_2'$ from the operation command data memory means 18' until the end-of-duration data $I_4'$ is produced by the key-touch value maintaining means 24' after the duration sustain command data $I_6$ has been supplied from the operation command data discriminating means 70 at each of the addresses thereof. Further provided as part of the key-touch value calculating means 14' is key-touch value subtracting means 26′ which is responsive to the subtraction command data $I_7$ read out from the key-touch value maintaining means 24′ and which is operative to subtract a predetermined quantity such as a binary number of 1 from the key-touch value represented by the data $I_3'$ currently stored in the key-touch value memory means 20′ at the address corresponding to the selected key.

The embodiment of FIG. 6 thus includes counterparts, in effect, of all the component means of the embodiment described with reference to FIG. 1 and, for this reason, the circuit arrangements implementing the embodiment of FIG. 6 also includes all the component units and networks which constitute the circuit arrangement illustrated in FIG. 2. Description will therefore be hereinafter made in regard to the modes of operation of the embodiment of FIG. 6 with reference to FIGS. 6 and 7 as well as concurrently to FIG. 2.

Figure 7:
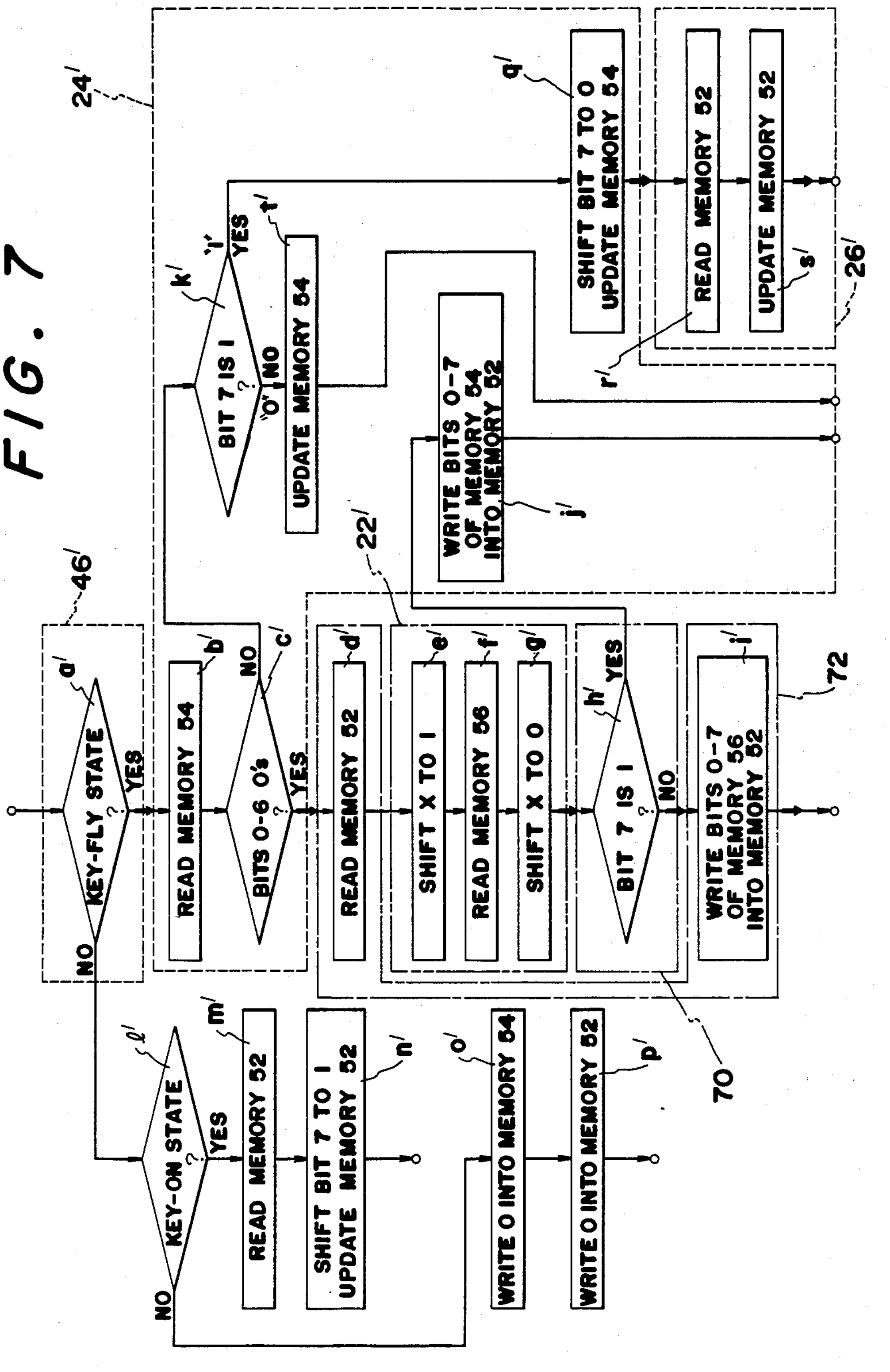
FIG. 7 is a flowchart showing the program in accordance with which the key-touch value control device implementing the embodiment shown in FIG. 6 is to operate.

In operation, key-state signals $S_k$ are supplied successively from the key-state signal generating means 12 constituted by the touch response elements 64 to the processing unit 36 which forms part of the key-touch value calculating means 14′. Each of these key-state signals $S_k$ is indicative of the key-on, key-off or key-fly state of the key associated with the touch response element 64 from which the particular key-state signals $S_k$ is issued, as previously discussed. FIG. 7 shows the flowchart of the various steps which are to take place in response to each of these key-state signals $S_k$. In response to each of these key-state signals $S_k$, the processing unit 36 determines whether or not each of the key-state signals $S_k$ received at the input port 36 (FIG. 2) indicates the key-fly state as at step a′ in the flowchart of FIG. 7. If the answer in the step a in FIG. 7 is in the affirmative "YES", the processing unit 36 delivers key-fly data $I_1$ (FIG. 6) indicating that the key associated with the touch response element 64 from which the key-state signal $S_k$ currently received has issued is in the key-fly state. In this instance, the processing unit 36 supplies a read operation command data signal to the read/write shift control terminal of the time duration memory 54 and reads seven-bit data (bit 0 to bit 6) from the time duration memory 54 at the address corresponding to the key under consideration, as at step b′ in the flowchart of FIG. 7. On the basis of the seven-bit data thus read from the time duration memory 54, the processing unit 36 determines whether or not all of the seven bits included in the data are 0's, as at step c′ in the flowchart of FIG. 7. If it is determined in this step c′ that all of the seven bits read out from the memory 54 are 0's, the processing unit 36 delivers end-of-duration data $I_4'$. In this instance, only the data stored at the address which corresponds to the key under consideration is read from the time duration memory 54 by means of the processing unit 36 as previously discussed in respect of the circuit arrangement shown in FIG. 2. The function of the processing unit 36 to determine whether or not a given key of the instrument is in the key-fly state provides the key-fly state detecting means 16′ in the embodiment shown in FIG. 6.

The read operation command data signal appearing at the read/write control signal line 62 leading from the processing unit 36 is also fed to the read/write shift control terminal of the key-touch value memory 52. When it is found that all of the seven bits included in the data read from the time duration memory 54 are 0's, the processing unit 36 reads eight-bit data $I_3'$ from the key-touch value memory 52 at the address assigned to the key under consideration, as at step d′ in FIG. 7. The processing unit 36 then shifts the address signal X from the logic "0" state to the logic "1" state at its output port 36*b* as at step e′ in FIG. 7 and determines, on the basis of the eight-bit key-touch value data $I_3$ read from the key-touch value memory 52, the address at which eight-bit data $I_2'$ is to be read from the operation command data memory 56 and reads such data $I_2'$ from the memory 56 as at step f′ in FIG. 7. Thereafter, the processing unit 36 shifts the address signal X from the logic "1" state back to the logic "0" state as at step g′ in FIG. 7 as in the circuit arrangement described with reference to FIG. 2. The above described functions of the processing unit 36 which are represented by the steps e′ to g′ in the flowchart of FIG. 7 provide the operation command data read-out control means 22′ in the key-touch value calculating means 14′ shown in FIG. 6. The data $I_2$ read out from the operation command data memory 56 by the processing unit 36 is supplied as the operation command data to the key-touch value maintaining means 24′.

The processing unit 36 then determines whether the flag bit assigned to the seventh bit (the most significant bit) of the eight-bit operation command data $I_2'$ read out from the operation command data memory 56 is 1 as at step h′ in the flowchart of FIG. 7. This function of the processing unit 36 provides the operation command data discriminating means 70 forming part of the key-touch value calculating means 14′ of the embodiment shown in FIG. 6. If the answer in the step h′ is in the negative "NO", viz., the flag bit of the operation command data $I_2'$ is 0, the processing unit 36 produces update command data $I_5$ for loading the operation command data $I_2'$ into the key-touch value memory 52 at the address assigned to the key under consideration, as at step i′ in the flowchart of FIG. 7. The operation command data $I_2'$ is thus stored as the key-tough value data $I_3'$ in the key-touch value memory 52 at the address corresponding to the key under consideration. The processing unit 36 then awaits the arrival of the subsequent key-state signal $S_k$. The above described functions of the processing unit 36 to execute the steps d′ and i′ in the flowchart of FIG. 7 provide the key-touch value updating means 72 in the key-touch value calculating means 14′ of the embodiment shown in FIG. 6. If, on the other hand, the answer in the step h′ is in the affirmative "YES", viz., the flag bit of the operation command data $I_2'$ is 1, the processing unit 36 produces duration sustain command data $I_6$ for loading the operation command data $I_2'$ into the time duration memory 54 at the address assigned to the key under consideration, as at step j′ in the flowchart of FIG. 7. The processing unit 36 then awaits the arrival of the subsequent key-state signal $S_k$.

Unless and until the data stored in the time duration memory 54 shifts to decimal 0, the answer in the step c′ in the flowchart of FIG. 7 remains in the negative "NO", and the processing unit 36 determines whether or not the seventh bit (the most significant bit) of the eight-bit data read from the time duration memory 54 is 1 as at step k′ of the flowchart shown in FIG. 7. Since the answer in the step h′ is in the affirmative "YES" and since the answer in the step c was shifted to the negative "NO" after the step j′ had been performed, the answer in the step k′ must be in the affirmative "YES", viz., the seventh bit of the data read from the time duration memory 54 must be 1 on the first pass of the flow of operation. In this instance, the processing unit 36 shifts the seventh bit of the data back to 0 and simultaneously subtracts a binary number of 1 from the data at the address corresponding to the key under consideration. These steps are indicated as step q' in the flowchart of FIG. 7. The processing unit 36 loads the updated data into the time duration memory 54 at the address corresponding to the key under consideration and produces subtraction command data $I_7$. Thereupon, the processing unit 36 reads data $I_3'$ from the key-touch value memory 52 at the address corresponding to the key under consideration as at step r' in the flowchart of FIG. 7 and subtracts a binary number of 1 from the data read from the key-touch value memory 52. The processing unit 36 loads the updated data into the key-touch value memory 52 at the address corresponding to the key under consideration as at step s' in the flowchart of FIG. 7 and produces subtracted key-touch value data $I_7$, thereafter awaiting the arrival of the subsequent key-state signal $S_k$.

In each of the subsequent cycles of operation, the answer in the step k' in the flowchart of FIG. 7 is in the negative "NO" since the seventh bit of the data stored in the time duration memory 54 has been shifted back to 0 at the step q as described above. Thus, a binary number of 1 is subtracted from the data time duration memory 54 during each of the successive cycles of operation as at step t' in the flowchart of FIG. 7 until the data thus updated restores the decimal number 0. When the data read from the time duration memory 54 assumes the decimal number 0, the answer in the step c' in the flowchart of FIG. 7 turns affirmative "YES" so that the processing unit 36 delivers the end-of-duration data $I_4'$.

The functions of the processing unit 36 to take the steps b', c', j', k', q' and t' as above described provide the key-touch value maintaining means 24' (FIG. 6) and, furthermore, the functions of the processing unit 36 to take the steps r' and s' provide the key-touch value subtraction means 26' which forms part of the key-touch value calculating means 14' of the embodiment shown in FIG. 6.

When the key which has been under consideration reaches the key-on state, the answer in the step a' in the flowchart of FIG. 7 turns negative "NO" so that the processing unit 36 determines that the key-fly state of the particular key is now over, as at step 1' in the flowchart of FIG. 7. The data $I_3$ stored in the key-touch value memory 52 at the address corresponding to the key under consideration is read from the memory 52 as at step m' in FIG. 7, whereupon a logic "1" flag is raised at the seventh bit of the particular data. The data thus updated is memorized at the same address of the key-touch value memory 52 as at step n' in the flowchart of FIG. 7. When the key under consideration is thereafter assumes the key-off state, the answer in the step 1 in the flowchart of FIG. 7 turns negative "NO". The processing unit 36 then clears the data $I_3$ which have been memorized in the key-touch value memory 52 and the time duration memory 54 at the addresses corresponding to the key which has been under consideration as at steps o' and p' in the flowchart of FIG. 7, thereby putting an end to the operation for the particular key.

Figure 8:
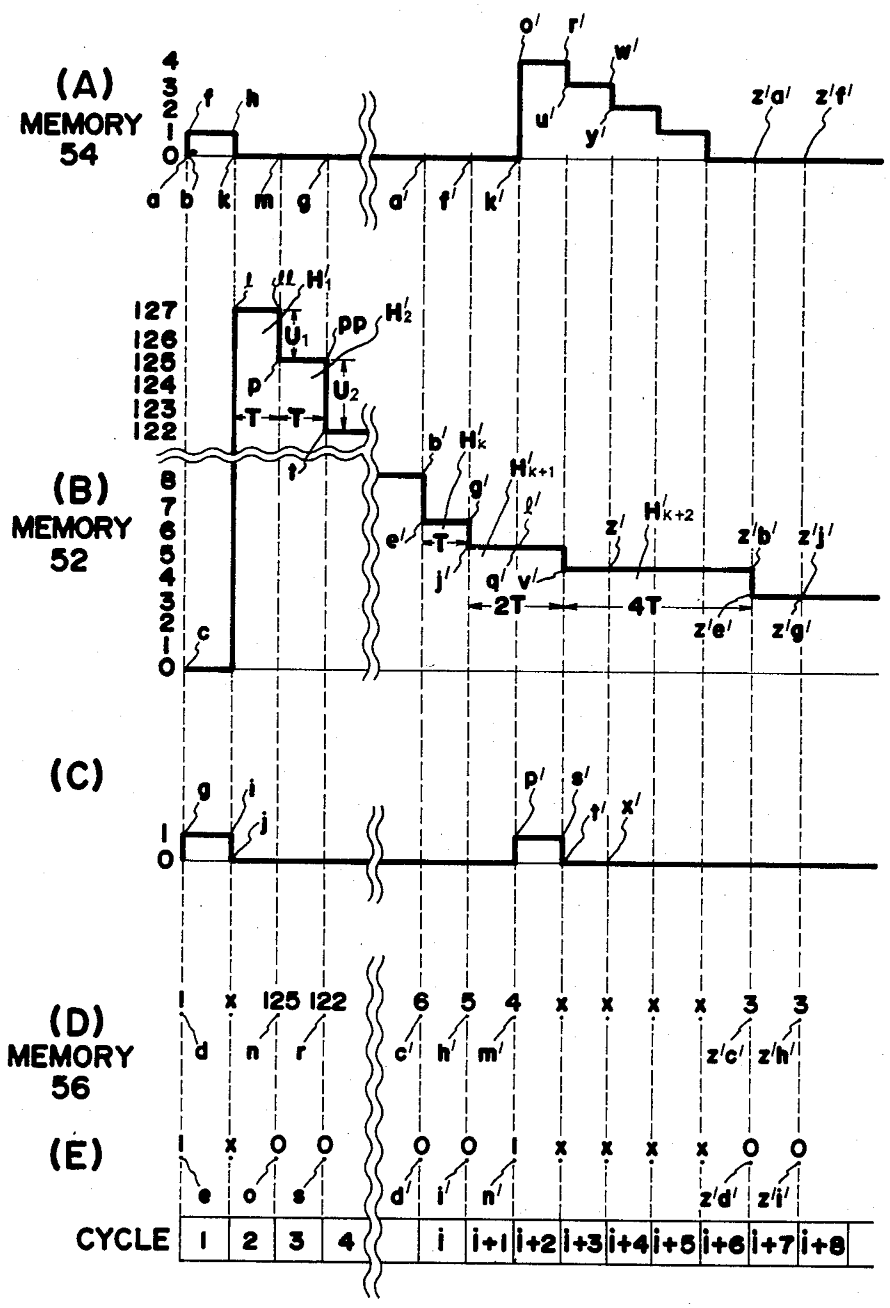
FIG. 8 is a view showing the logic states of the memory circuits included in the key-touch value control device implementing the embodiment illustrated in FIG. 6, wherein section (A) shows the decimal numbers represented by the logic states of the data in the time duration memory, section (B) shows decimal numbers represented by the logic states of the data in the key-touch value memory, section (C) shows the logic status of the flag bit included in the data in the time duration memory, section (D) shows the decimal numbers represented by the logic states of the data in the operation command data memory of the key-touch value control device implementing the embodiment illustrated in FIG. 6, and section (E) shows the answer in the affirmative "YES" by number 1 and the answer in the negative by number 0 at one of the steps in the flowchart of FIG. 7.

The operation of the embodiment of FIG. 6 will be hereinafter described more specifically with reference to FIGS. 6 and 7 and further to FIGS. 8 and 9. In FIG. 8, section (A) shows the decimal numbers represented by the data in the time duration memory 54, section (B) shows decimal numbers represented by the data $I_3$ in the key-touch value memory 52, and section (C) shows the logic status of the flag bit included in the data in the time duration memory 54. Section (D) shows the decimal numbers represented by the data $I_2$ in the operation command data memory 56 of the key-touch value control device implementing the embodiment illustrated in FIG. 6, and section (E) shows the answer in the affirmative "YES" by number 1 and the answer in the negative by number 0 at one of the step h' in the flowchart of FIG. 7. The stepped curve in thick lines as shown in the section (B) of FIG. 8 indicates the functional relationships between the durations of key-fly states and the key-touch values to respectively correspond to the durations of the key-fly states during successive cycles of operation of the key-touch value control device shown in FIG. 6.

When the processing unit 36 determines that the key selected in a first cycle of operation is in the key-fly state at the step a' of the flowchart in FIG. 7, the unit 36 reads seven-bit data (bit 0 to bit 6) from the time duration memory 54 at the address corresponding to the particular key at the step b' in FIG. 7 as previously discussed. The time duration memory 54 has been reset during the preceding cycle of operation and has stored therein data representative of the decimal number 0 as indicated at a in section (A) of FIG. 8. All of the eight bits included in the data read from the time duration memory 54 are thus 0's so that the answer in the step c' in FIG. 7 is naturally in the affirmative "YES" as indicated at b in the section (A) of FIG. 8. The processing unit 36 then reads data $I_3$ from the key-touch value memory 52 at the address assigned to the key under consideration at the step d' in FIG. 7. The key-touch value memory 52 has also been reset during the preceding cycle of operation and has stored therein data $I_3$ representative of the logic "0" state as indicated at c in section (B) of FIG. 8.

Data is then read by the processing unit 36 from the operation command data memory 56 at the address specified by the eight-bit data $I_3$ thus read out from the key-touch value memory 52 at the steps e' to g' in FIG. 7. The data $I_2$ read from the operation command data memory 56 is herein assumed to be in the form of "1/0000001" as indicated at d in section (D) of FIG. 8 and on row a in FIG. 9, the answer in the step h' in FIG. 7 being thus in the affirmative "YES" as indicated at e in section (E) of FIG. 8. Such data $I_2$ (1/0000001) is loaded into the time duration memory 54 at the address assigned to the key under consideration at the step j' shown in FIG. 7, as indicated at f in the section (A) of FIG. 8 so that the seventh bit of the data stored in the time duration memory 54 is 1, as indicated at g in section (C) of FIG. 8.

During the immediately subsequent cycle of operation, the processing unit 36 also read data from the time duration memory 54 (step b' of FIG. 7). In this instance, the eight-bit data stored in the time duration memory 54 is representative of a decimal number of 1 as indicated at h in the section (A) of FIG. 8 insofar as the key-state signal $S_k$ currently received by the processing unit 36 is indicative of the key-fly state. In this instance, the answer in the step c' in the flowchart of FIG. 7 is in the negative "NO" and, in addition, the seventh bit of the data stored in the time duration memory 54 is 1 as indicated at i in the section (C) of FIG. 8. Accordingly, the answer in the step k' in the flowchart of FIG. 7 is in the affirmative "YES" so that the processing unit 36 shifts the seventh bit of the data in the time duration memory 54 back to 0 as indicated at j in the section (C) and simultaneously updates the data in the time duration memory 54 by subtraction of a binary number of 1 therefrom at the step q' in FIG. 7, as indicated at k in the section (A) of FIG. 8. Subsequently, the processing unit 36 reads the data $I_3'$ from the key-touch value memory 52 at the step r' in FIG. 7 and updates the data by subtraction of a binary number of 1 therefrom at the step at the step s' in FIG. 7, as indicated at l in the section (B) of FIG. 8. The data ("1111111") thus stored into the key-touch value memory 52 during the third cycle of operation represents the decimal number 127 as indicated at ll in the section (B) of FIG. 8.

During the third cycle of operation, the data stored in the time duration memory 54 is representative of a decimal number of 0 as indicated at m in the section (A) of FIG. 8 so that the answer in the step c' in the flowchart of FIG. 7 is in the affirmative "YES". As indicated at ll in section (B) of FIG. 8, the processing unit 36 then reads data $I_2$ from the operation command data memory 56 at the address (127) specified by the data $I_3$ read from the key-touch value memory 52 at the steps d' to g' in FIG. 7. The data $I_2$ thus read out from the operation command data memory 56 is assumed to be in the form of "0/1111101" (which represents the decimal number 125) as indicated at n in the section (D) of FIG. 8 and on row b in FIG. 9 so that the answer in the step h' in FIG. 7 is in the negative "NO" as indicated at o in the section (E) of FIG. 8. The data "0/1111101" (decimal number 125) is loaded as the key-touch value data $I_3'$ into the key-touch value memory 52 at the step i' in the flowchart of FIG. 7, as indicated at p in the section (B) of FIG. 8. The data "01111101" thus stored into the key-touch value memory 52 during the third cycle of operation represents the decimal number 125.

During the fourth cycle of operation, the data stored in the time duration memory 54 is of the logic state representative of a decimal number of 0 as indicated at q in the section (A) of FIG. 8 so that the answer in the step c' in the flowchart of FIG. 7 is also in the affirmative "YES". The processing unit 36 then reads data $I_2$ from the operation command data memory 56 at the address (125) specified by the data $I_3$ read from the key-touch value memory 52 at the steps d' to g' in FIG. 7. As indicated at pp in section (B) of FIG. 8, the data $I_2$ thus read out from the operation command data memory 56 is assumed to be in the form of "0/1111010" (decimal number 122) as indicated at r in the section (D) of FIG. 8 and on row c in FIG. 9 so that the answer in the step h' in FIG. 7 is in the negative "NO" as indicated at s in the section (E) of FIG. 8. The data "0/1111010" is loaded as the key-touch value data $I_3'$ into the key-touch value memory 52 at the step i' in the flowchart of FIG. 7, as indicated at t in the section (B) of FIG. 8.

Thus, the stepped curve of the section (B) has horizontal segments each having a unit time duration T corresponding to the duration of one cycle of operation and desired decrements $U_1$ and $U_2$ which are dictated by the operation comand data.

The cycles of operation proceed as above described and, during the ith cycle of operation, the data stored in the time duration memory 54 may be representative of a decimal number of 0 as indicated at a' in the section (A) of FIG. 8 and the data $I_3$ stored in the key-touch value memory 52 may be representing a decimal number of 8 as indicated at b' in the section (B) of FIG. 8. The data $I_2'$ stored at the eighth address in the operation command data memory 56 is assumed to be in the form of "0/0000110" (decimal number 6) as indicated at d' in the section (E) of FIG. 8 and on row d of FIG. 9. The data $I_2'$, the seventh (viz., the most significant) bit of which is now 0 as indicated at d' of the section (E) in FIG. 8, is loaded into the key-touch value memory 52 as the key-touch value data $I_3'$. The key-touch value represented by the data in the key-touch value memory 52 is thus reduced from 8 to 6 in terms of decimal number during the ith cycle of operation as indicated at e' in the section (B) of FIG. 8.

During the subsequent (i+1)th cycle of operation, the data stored in the time duration memory 54 is also of the logic state representative of a decimal number of 0 as indicated at f' in the section (A) of FIG. 8 and the data $I_3$ stored in the key-touch value memory 52 is representing the decimal number 6 as indicated at g' in the section (B) of FIG. 8. The data $I_2'$ stored at the sixth address in the operation command data memory 56 is assumed to be in the form of "0/0000101" (decimal number 5) as indicated at h' in the section (D) of FIG. 8 and on row e of FIG. 9. The data $I_2'$, the seventh bit of which is 0 as indicated at i' of the section (E) in FIG. 8, is loaded into the key-touch value memory 52 as the key-touch value data $I_3$. The key-touch value represented by the data in the key-touch value memory 52 is thus further reduced from 6 to 5 in terms of decimal number during the (i+1)th cycle of operation as indicated at j' in the section (B) of FIG. 8. The stepped curve of the section (B) of FIG. 8 now has a horizontal segment having a time duration T corresponding to the duration of one cycle of operation and a desired decrement dictated by the operation command data as indicated at $H_k'$.

During the subsequent (i+2)th cycle of operation, the data stored in the time duration memory 54 is also of the logic state representative of a decimal number of 0 as indicated at k' in the section (A) of FIG. 8 and the data $I_3$ stored in the key-touch value memory 52 is in the logic state representing the decimal number 5 as indicated at l' in the section (B) of FIG. 8. The data $I_2'$ stored at the fifth address in the operation command data memory 56 is assumed to be in the form of "1/0000100" (decimal number 4) as indicated at m' in the section (D) of FIG. 8 and on row f of FIG. 9. The data $I_2'$, the seventh bit of which is 1 as indicated at n' of the section (E) in FIG. 8, is loaded into the time duration memory 54 by the step j' in the flowchart of FIG. 7 as indicated at o' in section (A) of FIG. 8. The key-touch value represented by the data in the key-touch value memory 52 is maintained unchanged during the (i+2)th cycle of operation as indicated at q' in the section (B) of FIG. 8.

During the subsequent (i+3)th cycle of operation, the data stored in the time duration memory 54 is of the state representative of the decimal number 4 as indicated at r' in the section (A) of FIG. 8 and has the seventh bit of 1 as indicated at s' of the section (C) in FIG. 8. The processing unit 36 thus shifts the seventh bit of the data back to 0 as indicated at t' of the section (C) in FIG. 8 and simultaneously subtracts a binary number of 1 from the data of the memory as indicated at u' of the section (B) in FIG. 8. It therefore follows that binary number 1 is subtracted from the key-touch value represented by the data in the key-touch value memory 52 so that the key-touch value memorized in the memory is reduced from 5 to 4 during the (i+3)th cycle of operation as indicated at v in the section (B) of FIG. 8. The stepped curve of the section (B) of FIG. 8 now has a horizontal segment having a pp 2T corresponding to the duration of two cycles of operation and a desired decrement as indicated at $H_{k+1}'$.

During the subsequent (i+4)th cycle of operation, the data stored in the time duration memory 54 represents the decimal number 3 as indicated at w' in the section (A) of FIG. 8 and has the seventh bit of 0 as indicated at x' of the section (C) in FIG. 8. Binary number 1 is further subtracted from the key-touch value represented by the data in the key-touch value memory 52 so that the key-touch value memorized in the memory 53 is reduced to 2 as indicated at y' of the section (A) in FIG. 8. The key-touch value represented by the data in the key-touch value memory 52 is thus maintained at 4 in decimal number during the (i+4)th cycle of operation as indicated at z' in the section (B) of FIG. 8.

The key-touch value represented by the data in the key-touch value memory 52 is maintained unchanged until the data stored in the time duration memory 54 turns to 0. If, in this instance, the data stored in the time duration memory 54 is reduced to be representative of a decimal number of 0 in the (i+7)th cycle of operation as indicated at z'a' in the section (A) of FIG. 8, the answer in the step c' in the flowchart of FIG. 7 turns affirmative "YES". Since the data in the key-touch value memory 52 is in the state representing the decimal number 4 as indicated at z'b' in section (B) of FIG. 8 and if the data $I_2'$ at the fourth address of the operation command data memory 56 is given in the form of "0/0000011" (which represents the decimal number 3) as indicated at z'c' in the section (D) of FIG. 8 and on row g in FIG. 9 and thus has the seventh bit of 0 as indicated at z'd' in the section (E) of FIG. 8, the operation command data $I_2'$ representative of the numerical value 3 is loaded as the key-touch value data into the key-touch value memory 52. The result is that the key-touch value represented by the data in the key-touch value memory 52 is further reduced from 4 to 3 in terms of decimal number during the (i+7)th cycle of operation as indicated at z'e' in the section (B) of FIG. 8. The stepped curve of the section (B) of FIG. 8 now has a horizontal segment having a time duration 4T corresponding to the duration of four cycles of operation and a desired decrement in logic value as indicated at $H_{k+2}'$.

During the (i+8)th cycle of operation, the data stored in the time duration memory 54 is of the logic state representative of a decimal number of 0 as indicated at z'f' in the section (A) of FIG. 8 and the data stored in the key-touch value memory 52 is of the logic state representative of a decimal number of 3 as indicated at z'g' in the section (B) of FIG. 8. If, in this instance, the data $I_2'$ at the third address of the operation command data memory 56 is given in the form of "0/0000011" (which represents the decimal number 3) as indicated at z'h' in the section (D) of FIG. 8 and on row h in FIG. 9 and thus has the seventh bit of 0 as indicated at z'i' in the section (E) of FIG. 8, the operation command data $I_2'$ representative of the decimal number 3 is loaded as the key-touch value data into the key-touch value memory 52 as indicated at z'j' in the section (B) of FIG. 8. The data thus re-stored into the key-touch value memory 52 equals in decimal number to the data stored into the key-touch value memory 52 at the end of the preceding cycle of operation, with the result that the key-touch value represented by the data in the key-touch value memory 52 remains unchanged during the (i+8)th cycle of operation.

In the second preferred embodiment of the present invention, the least significant to sixth bits (bit 0 to bit 6) of the operation command data $I_2'$ to be stored in the operation command data memory 56 are selected to be respectively equal to the bits representative of the address at which the data is stored and the seventh (viz., the most significant) bit of the data is fixed at 0 so that a segment of the stepped curve of the section (B) of FIG. 8 can be obtained which is maintained unchanged until the processing unit 36 detects the end of the key-fly state of a key. Various combinations of the segments of the stepped curve of the section (B) of FIG. 8 can be produced and implemented on a real-time basis during a period of time for which a key is being shifted toward the key-on state thereof in accordance with of a predetermined key-touch value curve (not shown) as in the first embodiment described.

Description will now be made in regard to the manner in which the second multiplexer 46 and the key assigner 66 of the key-touch value calculating means of each of the embodiments hereinbefore described.

Turning back to FIG. 2 of the drawings, the second multiplexer 46 receives at its control terminal 46a a train of clock pulses supplied through the clock signal line 34b from the least significant bit output terminal of the frequency divider 32. During the period of time when the clock pulses thus supplied to the multiplexer 46 are maintained in the logic "1" state, the second multiplexer 46 receives at the first set of input terminals thereof the address signals delivered from the first multiplexer 42 and distribute these address signals to the key-touch value memory 52, time duration memory 54 and operation command data memory 56 through the address bus 50, thus enabling the various component elements of the key-touch value calculating means 14 or 14' (FIG. 1 or 6) to function as hereinbefore described. When, on the other hand, the clock pulses supplied through the clock signal line 34b are in the logic "0" state, selection address signals denoted as $B_4$ to $B_{12}$ are supplied to the second set of input terminals thereof through the selection address bus 68 and are distributed to the key-touch value memory 52, time duration memory 54 and operation command data memory 56 through the address bus 50.

In the case of the embodiment of the present invention as shown in FIG. 1, the clock pulses $C_0$ supplied from the least significant bit output terminal of the frequency divider 32 shift ten times between the logic "1" and "0" states while the fourth pulse signal $C_4$ supplied from the frequency divider 32 remains in either the logic "1" state or the logic "0" state. This fourth pulse signal $C_4$ from the frequency divider 32 is used to determine the time slot to be assigned to each of the keys of the instrument and the address pulse signals $C_4$ to $C_{10}$ from the frequency divider 32 indicate a certain address when the fourth pulse signal $C_4$ remains in the logic "1" or logic "0" state. As the clock pulses $C_0$ supplied from the least significant bit output terminal of the frequency divider 32 shift ten times between the logic "1" and "0" states as discussed above, the period of time for which the above certain address is represented by the address pulse signals $C_4$ to $C_{10}$ is divided into ten equal fractions which correspond to ten elementary periods of time. During each of the elementary periods of even-numbered orders, the address signals passed through the first multiplexer 42 are supplied to the second multiplexer 46 through the address bus 48 and further by way of the address bus 50 to the key-touch value memory 52, time duration memory 54 and operation command data memory 56. During each of the basic periods of odd-numbered orders, the selection address signals are supplied from the key assigner 66 to the second multiplexer 46 through the address bus 68 and further through the address bus 50 to the key-touch value memory 52, time duration memory 54 and operation command data memory 56. The key assigner 66 preferably includes a microprocessor and an example of the technique to effect time-sharing operation between such a key assigner and any external device such as a key-touch data memory is disclosed in Japanese Provisional Patent Publication No. 56-161594.

In the case of embodiment of FIG. 1, furthermore, the address represented by the address pulse signals $C_4$ to $C_{10}$ from the frequency divider 32 is accessed a maximum of five times during the period of time for which operation is to be performed for each of the keys of the instrument during a single cycle in which all of the keys are scanned. Thus, the period of time for which the operation is to be performed for each of the keys is divided into 5 times 2, viz., ten fractions (which correspond to the above mentioned elementary periods of both the even-numbered and odd-numbered orders) and, for this reason, the address bus 34*a* leading from the frequency divider 32 consists of a total of four machine cycle lines. In the case of embodiment of FIG. 6, on the other hand, the address represented by the address pulse signals $C_4$ to $C_{10}$ from the frequency divider 32 is accessed a maximum of four times during the period of time for which operation is to be performed for each of the keys of the instrument. It therefore suffices that the period of time for which the operation is to be performed for each of the keys is divided into eight fractions and, for this reason, the address bus 34*a* leading from the frequency divider 32 may consists of a total of three machine cycle lines.

The key assigner 66 forming part of the circuit arrangement shown in FIG. 2 has a high traffic function by virtue of which key codes indicative of the keys being depressed, key-touch values pertaining to the keys and gate signals responsive to the key-on signals issued for the keys are assigned to synthesizer modules provided in a number less than the number of the keys. For this purpose, a selection address signal is delivered from the output port 66*b* of the key assigner 66 to the selection address bus 68 during an elementary period in which the key-touch value is not calculated. Key-touch value data $I_3$ (FIG. 1) or $I_3'$ (FIG. 6) is then read out from the key-touch value memory 52 at the address specified by the selection address signal thus delivered from the key assigner 66 and is transferred through the input data bus 60 and the seventh-bit signal line 60*a* to the input port 66*a* of the key assigner 66. The transfer of the key-touch value data $I_3$ or $I_3'$ to the key assigner 66 is effected by the assignment function of the key assigner 66 per se without respect to the the order in which addresses are specified by the address signals which are supplied in succession from the frequency divider 32 to the key-touch value memory 52 by way of the address signal bus 38, 48.

The selection addresses for the transfer of the key-touch value data to the key assigner 66 are delivered from the key assigner 66 not at a rate equal to the rate at which addresses are accessed for the processing of the key-touch values. The selection addresses are delivered successively upon completion of the assignment operation in the key assigner 66. Synchronism can however be achieved between the addresses accessed for the processing of the key-touch values and the selection addresses for the transfer of the key-touch value data to the key assigner 66 since the clock pulses for the processing of the key-touch values are supplied to the clock input port 66*c* of the key assigner 66 so that the transfer of the key-touch value data $I_3$ or $I_3'$ to the key assigner 66 is effected during elementary periods in which the key-touch values are not calculated.

The key-touch value data $I_3$ or $I_3'$ through the input data bus 60 to the input port 66*a* of the key assigner 66 is temporarily memorized in the input port 66*a* of the key assigner 66. The key assigner 66 then assigns the key-touch value and a key-on state signal to a selected synthesizer module. For this purpose, the key-on state signal is provided by a flag bit which is formed by the seventh bit (the most significant bit) of the key-touch value data $I_3$ or $I_3'$ memorized in the input port 66*a* of the key assigner 66. When the key-on state signal, viz., the seventh bit of the key-touch value data $I_3$ or $I_3'$ is found to be 2, then the particular key-touch value data, the selection address signal currently memorized in the output port 66*b* of the key assigner 66, viz., the key code which represents the pitch of the key and the gate signal produced as a sound operation command data signal on the basis of the above mentioned flag bit are assigned to the selected synthesizer module. There are known various logics to achieve these functions, one of which is disclosed in Japanese Provisional Patent Publication No. 55-25078. According to the technique therein taught, the currently earliest one of the synthesizer modules which have been allowed to cease production of sounds is captured for the production of the sound for the currently selected key whereby the other synthesizer modules allowed to cease production of sounds are enabled to continue production of the sound until the sounds attenuate.

Figure 10:
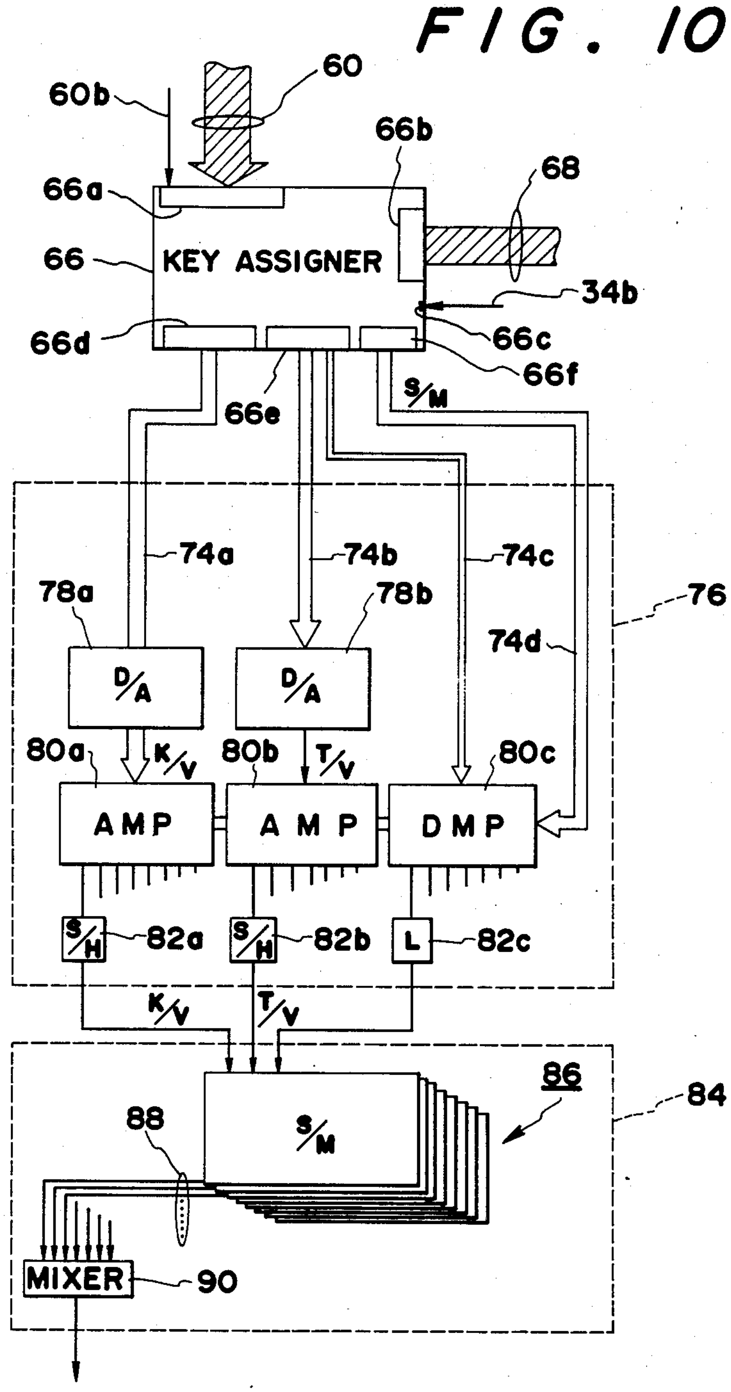
FIG. 10 is a block diagram showing an example of the arrangement of a key assigner and a sound signal generator which may be incorporated in a control device embodying the present invention.

In FIG. 10 of the drawings, the key assigner 66 is shown having, in addition to the input port 66*a* for the key-touch value data $I_3$ or $I_3'$, the output port 66*b* for the selection address signals and the clock pulse input port 66*c*, a key-code output port 66*d*, a key-touch value and gate-signal output port 66*e* and a synthesizer-module address signal output port 66*f*. Thus, the key code indicative of the key being depressed is issued from the key-code output port 66*d*, and the key-touch value pertaining to the particular key and the gate signal, which is in a logic "1" state when instructing the synthesizer module to produce sound are issued from the key-touch value and gate-signal output port 66*e*. From the synthesizer-module address signal output port 66*f* is issued a synthesizer-module address signal to specify the selected synthesizer module to which the above mentioned key code, key-touch value and gate signals are to be assigned. The key code, key-touch value, gate signal and synthesizer-module address signal thus issued from the ports 66*d*, 66*e* and 66*f* are fed through buses 74*a*, 74*b*, 74*c* and 74*d*, respectively, to a data processing unit 76. The data processing unit 76 comprises first and second or key-code and key-touch value digital-to-analog converters 78*a* and 78*b* (D/A) connected to the key-code output port 66*d* and the key-touch value and gate-signal output port 66*e* of the key assigner 66 through the buses 74*a* and 74*b*, respectively. The first or key-code digital-to-analog converter 78*a* has output terminals connected to a first or key-voltage (K/V) analog multiplexer 80*a* (AMP) and likewise the second or key-touch value digital-to-analog converter 78*b* has output terminals connected to a first or key-touch value (T/V) analog multiplexer 80*b* (AMP). The data processing unit 76 further comprises a gate-signal digital multiplexer 80*c* having input terminals also connected to the key-touch value and gate-signal output port 66*e* of the key assigner 66 through the bus 74*c*. These multiplexers 80*a*, 80*b* and 80*c* have address terminals connected to the synthesizer-module address signal output port 66*f* through an address bus 74*d*. The key-code and key-touch value analog multiplexers 80*a* and 80*b* have output terminals connected to sample and hold circuits 82*a* and 82*b* (S/H), respectively, and the gate-signal digital multiplexer 80*c* has output terminals connected to latch circuits 82*c* (L). The sample and hold circuits 82*a* and 82*b* and the latch circuits 82*c* have output terminals connected to a sound signal generator 84. The sound signal generator 84 comprises a plurality of synthesizer modules 86 each having input terminals connected to the sample and hold circuits 82*a* and 82*b* and the latch circuits 82*c*. These synthesizer modules 86 are provided in a number considerably smaller than the number of the keys provided in the instrument and have respective output terminals connected through lines 88 to a mixing unit 90.

In operation, a key code signal is delivered from the key-code output port 66*d* of the key assigner 66 and is fed through the bus 74*a* to the key-code digital-to-analog converter 78*a* so as to be converted into a voltage indicative of the key code of the selected key of the instrument. The signal voltage thus produced by the digital-to-analog converter 78*a* is suppled to the key-code analog multiplexer 80*a*. On the other hand, a key-touch value signal pertaining to the particular key specified by the key-code signal is delivered from the key-touch value and gate-signal output port 66*e* of the key assigner 66 to the key-touch value digital-to-analog converter 78*b* through the bus 74*b* so as to be converted into a signal voltage indicative of the key-touch value represented by the input signal. The signal voltage produced by the digital-to-analog converter 78b is suppled to the key-touch value analog multiplexer 80*b*. Furthermore, a gate signal is also delivered from the key-touch value and gate-signal output port 66*e* of the key assigner 66 and is fed direct to the digital multiplexer 80*c*. One of the synthesizer module 86 of the sound signal generator 84 is thus selected by the operation performed by the assignment logics of the key assigner 66 and, thus, a synthesizer module address signal S/M is supplied from the synthesizer address signal output port 66*f* of the key assigner 66 to each of the multiplexers 80*a*, 80*b* and 80*c* through the address bus 74*d*. Accordingly, the key-code and key-touch value analog multiplexers 80*a* and 80*b* are actuated to pass the supplied key-code and key-touch value voltages to their respective output terminals specified by this synthesizer module address signal S/M and, likewise, the gate signal digital multiplexer 80*c* is actuated to pass the supplied gate signal to its output terminal specified by the signal S/M. The key-code and key-touch value voltages thus appearing at the specified ones of the output terminals of the multiplexers 80*a* and 80*b* are fed to the sample and hold circuits 82*a* and 82*b*, respectively, corresponding to the synthesizer module 86 specified by the address signal S/M and the digital gate signal appearing at the specified one of the output terminals of the multiplexer 80*c* is fed to the latch circuit 82*c* corresponding to the synthesizer module 86 specified by the address signal S/M. The signal voltages thus supplied to the sample and hold circuits 82*a* and 82*b* and the digital gate signal supplied to the latch circuit 82*c* are temporarily registered therein and are continuously supplied to the selected synthesizer module 86. The selected synthesizer module 86 is actuated to supply to the mixing unit 90 a sound signal having a pitch dictated by the key-code voltage continuously supplied from the sample and hold circuit 82*a* and a sound pattern dictated by the key-touch value voltage from the sample and hold circuit 82*a* for a period of time dictated by the gate signal supplied from the latch circuit 82*c*. When two or more of the keys are being depressed concurrently, sound signals are supplied from the corresponding number of synthesizer modules 86 to the mixing unit 90 through the respectively associated lines 88 and are mixed together to form a composite sound signal representative of the sound to be produced. The amplitude of the sound produced on the basis of the signal thus supplied from the sound signal generator 84 is varies in accordance with the key-touch voltage from the key-touch value sample and hold circuit 82*b*. The key-touch value signal supplied from the key assigner 66 varies with the velocity at which the key is being depressed and with certain functional relationships and thus the amplitude of the sound produced can be adjusted depending upon the velocity of movement of the key.

While only two preferred embodiments of a key-touch value control device according to the present invention and only one example of the practical circuit arrangement to implement such embodiments have thus far been described, it should be borne in mind that these embodiments and the circuit arrangement are merely illustrative of the subject matter of the present invention and may therefore be modified or changed in numerous manners if desired.

For example, each of the touch response elements 64 described as constituting the key-state signal generating means 12 may be modified in various manners insofar as the touch response element is capable of discriminating the key-on, key-off and ky-fly state of the associated key from each other.

While, furthermore, the key-state signals $S_k$ produced by a number of touch response elements 64 are transmitted to the processing unit 36 in a time-sharing, multiplexed mode through lines common to the touch response elements 64, the touch response elements 64 may be connected to the processing unit 36 by lines which are respectively proper to the individual touch response elements 64.

On the other hand, the addresses of each of the key-touch value memory 52 and time duration memory 54 are accessed synchronously as the keys are selected and thus the processing unit 36 is constructed to be operable for time-sharing, multiplexed processing of the signals to be assigned to the plurality of keys in the circuit arrangement described with reference to FIG. 2. If desired, however, there may be provided a number of processing and memory units which are respectively associated with the individual keys of the instrument.

Although, moreover, it has been described a key assigner is provided between the key-touch value calculating means and the synthesizer modules, such an arrangement is merely by way of example and, thus, synthesizer modules may be connected direct to the key-touch value calculating means.

As will have been understood from the foregoing description, a key-touch value control device according to the present invention is characterized in that, inter alia, key touch values are calculated in such a manner as to follow a curve which can be modified by modifying the configuration of operation command data and that such calculation is executed on a real time basis during the periods of time for which keys are being depressed. The calculation of the key-touch values can thus be effected without monitoring the periods of time for which keys are being depressed and, for this reason, a key-touch value control device according to the present invention can be constructed compactly since no such means need be provided that would otherwise be required for monitoring the durations of key-fly states and converting the resultant time durations into key-touch values to follow a desired or predetermined characteristic curve.

What is claimed is:

1. A key-touch value control device for an electronically operated musical instrument for producing sound with a variable volume and including a series of keys each having a key-off state wherein no finger pressure is applied, a key-on state wherein a key is fully depressed under a pressure manually applied to the key and a key-fly state wherein a key is moving from said key-off state toward said key-on state at a variable velocity, comprising:

a key-state signal generating means for detecting the state of each of said keys and for producing a succession of key-state signals each indicative of one of the key-on state, key-off state and key-fly state of the key, and a key-touch value calculating means for calculating a key-touch value on a real-time basis during a period of time when a key is being depressed toward said key-on state and for producing, in response to each of said key-state signals, a key-touch value signal which is representative of said key-touch value, said key-touch value signal being variable with the velocity at which the key is being depressed toward the key-on state and which is representative of the volume of the sound to be produced after the key has reached the key-on state;

wherein said key-touch value calculating means comprises:

(1) a key-fly state detecting means for detecting from generating means the key-fly state of a selected one of said keys and for producing key-fly data indicating that said selected one of said keys is in the key-fly state;

(2) an operation command data memory means having addresses for storing operation command data indicative of various time durations consisting of different number of successive cycles of operation each of said time durations ending upon termination of the last one of the successive cycles of operation providing a particular time duration;

(3) a key-touch value memory means having addresses for storing key-touch value data indicative of key-touch values for individual cycles of operation, the addresses of the key-touch value memory means being respectively assigned to the individual keys of the instrument;

(4) an operation command data read-out control means responsive to the key-fly data produced by said key-fly state detecting means for reading the operation command data stored in the memory means at the address specified by the key-touch value data read from said key-touch value memory means;

(5) a key-touch value maintaining means responsive to the operation command data read out from said operation command data memory means for monitoring an end of any of said time durations specified by the operation command data and for supplying end-of-duration data to said operation command data read-out control means upon an end of a particular time duration, said operation command data read-out control means being responsive to the end-of-duration data and for interrupting the reading of the data from the operation command data memory means until the end-of-duration data is produced by the key-touch value maintaining means after the operation command data has been read from the operation command data memory means at each of the addresses thereof, and (6) a key-touch value subtracting means responsive to the data read out from the operation command data memory means for subtracting a predetermined quantity from the key-touch value represented by the data stored in the key-touch value represented by the data stored in the key-touch value memory means at the address corresponding to said selected one of said keys.

2. A key-touch value control device for an electronically operated musical instrument for producing sound with a variable volume and including a series of keys each having a key-off state wherein no finger pressure is applied, a key-on state wherein a key is fully depressed under a pressure manually applied to the key and a key-fly state wherein a key is moving from said key-off state toward said key-on state at a variable velocity, comprising:

a key-state signal generating means for detecting the state of each of said keys and for producing a succession of key-state signals each indicative of one of the key-on state, key-off state and key-fly state of the key, and a key-touch value calculating means for calculating a key-touch vAlue on a real-time basis during a period of time when a key is being depressed toward said key-on state and for producing, in response to each of said key-state signals, a key-touch value signal which is representative of said key-touch value, said key-touch value signal being variable with the velocity at which the key is being depressed toward the key-on state and which is representative of the volume of the sound to be produced after the key has reached the key-on state;

wherein said key-touch value calculating means comprises:

(1) a key-fly state detecting means operative for detecting from each of the key-state signals from said key-state signal generating means the key-fly state of a selected one of said keys and for producing key-fly data indicating that said selected one of said keys is in the key-fly state, (2) an operation command data memory means having addresses for storing operation command data indicative of various time durations consisting of different numbers of successive cycles of operation each of said time durations ending upon termination of the last one of the successive cycles of operation providing a particular time duration, (3) a key-touch value memory means having addresses for storing key-touch value data indicative of key-touch values for individual cycles of operation, the operation command data stored in the operation command data memory means consisting of data including a flag element, and duration sustain data including a flag element, the addresses of the key-touch value memory means being respectively assigned to the individual keys of the instrument;

(4) an operation command data discriminating means for determining, in accordance with the flag element included in the operation command data read out from the operation command data memory means, whether the operation command data is said data updating data or said duration sustain data and for producing update command data or duration sustain command data when the operation command data is found to be the data updating data or the duration sustain data, respectively;

(5) an operation command data read-out control means for reading the operation command data stored in the operation command data memory means at the address specified by the key-touch value data read from said key-touch value memory means, the operation command data being read by the operation command data read-out control means in response to the key-fly data produced by the key-fly state detecting means;

(6) a key-touch value updating means responsive to the data update command data read out from said operation command data discriminating means for updating the key-touch value data currently stored in said key-touch value memory means into the operation command data read out from said operation command data memory means;

(7) a key-touch value maintaining means for producing substraction command data responsive to the duration sustain command data from said operation command data discriminating means and for monotoring an end of any of said time durations that is specified by the duration sustain data currently read from the operation command data memory means for supplying end-of-duration data to the operation command data read-out control means upon the end of any of said time durations which is specified by the duration sustain data, said operation command data read-out control means being responsive to the end-of-duration data for interrupting the reading of the data from the operation command data memory means until the end-of-duration data is produced by said key-touch value maintaining means after the duration sustain command data has been supplied from the operation command data discriminating means at each of the addresses thereof, and (8) a key-touch value substracting means responsive to the subtraction command data read out from said key-touch value maintaining means for substracting a predetermined quantity from the key-touch value represented by the data currently stored in the key-touch value memory means at the address corresponding to said selected one of said keys.

* * * * *